United States Patent
Forstall et al.

(10) Patent No.: US 10,508,921 B2
(45) Date of Patent: *Dec. 17, 2019

(54) LOCATION BASED TRACKING

(71) Applicant: Apple Inc., Cupertino, CA (US)

(72) Inventors: Scott Forstall, Mountain View, CA (US); Gregory N. Christie, San Jose, CA (US); Robert E. Borchers, Pleasanton, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/857,050

(22) Filed: Dec. 28, 2017

(65) Prior Publication Data

US 2018/0172449 A1 Jun. 21, 2018

Related U.S. Application Data

(63) Continuation of application No. 15/070,613, filed on Mar. 15, 2016, now Pat. No. 9,891,055, which is a
(Continued)

(51) Int. Cl.
*G01C 21/20* (2006.01)
*G06F 16/29* (2019.01)
(Continued)

(52) U.S. Cl.
CPC .............. *G01C 21/20* (2013.01); *G01C 21/00* (2013.01); *G06F 3/0482* (2013.01); *G06F 16/29* (2019.01);
(Continued)

(58) Field of Classification Search
CPC ......... G01C 21/20; G01C 21/00; G06F 16/29; G06F 3/0482; H04M 1/72522;
(Continued)

(56) References Cited

U.S. PATENT DOCUMENTS 4,644,351 A 2/1987 Zabarsky et al.
4,903,212 A 2/1990 Yokouchi et al.
(Continued)

FOREIGN PATENT DOCUMENTS

BR 9904979 12/2000
CA 2163215 11/1994
(Continued)

OTHER PUBLICATIONS

"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.
(Continued)

*Primary Examiner* — Gertrude Arthur Jeanglaude
(74) *Attorney, Agent, or Firm* — Jaffery Watson Mendonsa & Hamilton LLP

(57) ABSTRACT

Location information is used to build a database of locations having associated audio, video, image, or text data. In some implementations, a device includes a touch-sensitive display and collects data associated with a geographic location of interest. The geographic location of interest can be displayed on a map using an indicator. A touch selection of the indicator provides access to the data through an interface displayed on the touch-sensitive display. One or more locations of interest can be displayed and grouped together by an attribute.

21 Claims, 7 Drawing Sheets

Related U.S. Application Data continuation of application No. 14/584,747, filed on Dec. 29, 2014, now Pat. No. 9,310,206, which is a continuation of application No. 13/361,897, filed on Jan. 30, 2012, now Pat. No. 8,924,144, which is a continuation of application No. 12/164,866, filed on Jun. 30, 2008, now Pat. No. 8,108,144.

(60) Provisional application No. 60/946,813, filed on Jun. 28, 2007.

(51) Int. Cl.
   *H04W 4/029* (2018.01)
   *H04M 1/725* (2006.01)
   *G01C 21/00* (2006.01)
   *G06F 3/0482* (2013.01)

(52) U.S. Cl.
   CPC ..... *H04M 1/72522* (2013.01); *H04M 1/72572* (2013.01); *H04W 4/029* (2018.02); *H04M 2250/10* (2013.01); *H04M 2250/12* (2013.01); *H04M 2250/22* (2013.01)

(58) Field of Classification Search
   CPC .......... H04M 1/72572; H04M 2250/10; H04M 2250/12; H04M 2250/22; H04W 4/02
   USPC ........................................................ 701/412
   See application file for complete search history.

(56) References Cited

U.S. PATENT DOCUMENTS

| | | |
|---|---|---|
| 4,907,159 A | 3/1990 | Mange et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Yoneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare et al. |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,440,484 A | 8/1995 | Kao |
| 5,463,725 A | 10/1995 | Henckel |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss et al. |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw et al. |
| 5,630,206 A | 5/1997 | Urban et al. |
| 5,636,245 A | 6/1997 | Ernst et al. |
| 5,642,303 A | 6/1997 | Small et al. |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,269 A | 11/1997 | Norris |
| 5,689,270 A | 11/1997 | Kelley et al. |
| 5,689,431 A | 11/1997 | Rudow et al. |
| 5,708,478 A | 1/1998 | Tognazzini |
| 5,717,392 A | 2/1998 | Eldridge |
| 5,727,057 A | 3/1998 | Emery et al. |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,748,148 A | 5/1998 | Heiser et al. |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,771,280 A | 6/1998 | Johnson |
| 5,774,824 A | 6/1998 | Streit et al. |
| 5,774,829 A | 6/1998 | Cisneros et al. |
| 5,793,630 A | 8/1998 | Theimer et al. |
| 5,796,365 A | 8/1998 | Lewis et al. |
| 5,796,613 A | 8/1998 | Kato et al. |
| 5,799,061 A | 8/1998 | Melcher et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon et al. |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone et al. |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter et al. |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan et al. |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |

(56) References Cited

U.S. PATENT DOCUMENTS

| | | |
|---|---|---|
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,018,697 A | 1/2000 | Morimoto et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison et al. |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins et al. |
| 6,092,076 A | 7/2000 | McDonough et al. |
| 6,094,607 A | 7/2000 | Diesel |
| 6,101,443 A | 8/2000 | Kato et al. |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,381 A | 12/2000 | Bates et al. |
| 6,157,841 A | 12/2000 | Bolduc et al. |
| 6,163,749 A | 12/2000 | McDonough et al. |
| 6,166,627 A | 12/2000 | Reeley |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,185,427 B1 | 2/2001 | Krasner et al. |
| 6,188,959 B1 | 2/2001 | Schupfner |
| 6,195,557 B1 | 2/2001 | Havinis et al. |
| 6,195,609 B1 | 2/2001 | Pilley et al. |
| 6,199,014 B1 | 3/2001 | Walker et al. |
| 6,199,045 B1 | 3/2001 | Giniger et al. |
| 6,199,099 B1 | 3/2001 | Gershman et al. |
| 6,202,008 B1 | 3/2001 | Heckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,298,306 B1 | 10/2001 | Suarez et al. |
| 6,304,758 B1 | 10/2001 | Ierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,332,127 B1 | 12/2001 | Bandera et al. |
| 6,334,090 B1 | 12/2001 | Fujii |
| 6,339,437 B1 | 1/2002 | Nielsen |
| 6,339,746 B1 | 1/2002 | Sugiyama et al. |
| 6,343,317 B1 | 1/2002 | Glorikian |
| 6,345,288 B1 | 2/2002 | Reed et al. |
| 6,351,235 B1 | 2/2002 | Stilp |
| 6,353,398 B1 | 3/2002 | Amin et al. |
| 6,353,406 B1 | 3/2002 | Lanzl |
| 6,353,743 B1 | 3/2002 | Karmel |
| 6,353,837 B1 | 3/2002 | Blumenau |
| 6,356,761 B1 | 3/2002 | Huttunen et al. |
| 6,356,763 B1 | 3/2002 | Kangas et al. |
| 6,356,836 B1 | 3/2002 | Adolph |
| 6,356,838 B1 | 3/2002 | Paul |
| 6,370,629 B1 | 4/2002 | Hastings et al. |
| 6,377,810 B1 | 4/2002 | Geiger et al. |
| 6,377,886 B1 | 4/2002 | Gotou |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,401,027 B1 | 6/2002 | Xu et al. |
| 6,401,032 B1 | 6/2002 | Jamison et al. |
| 6,405,034 B1 | 6/2002 | Tijerino |
| 6,405,123 B1 | 6/2002 | Rennard et al. |
| 6,411,899 B2 | 6/2002 | Dussell et al. |
| 6,414,635 B1 | 7/2002 | Stewart et al. |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |
| 6,446,004 B1 | 9/2002 | Cao et al. |
| 6,449,485 B1 | 9/2002 | Anzil |
| 6,452,498 B2 | 9/2002 | Stewart |
| 6,456,234 B1 | 9/2002 | Johnson |
| 6,456,956 B1 | 9/2002 | Xiong |
| 6,459,782 B1 | 10/2002 | Bedrosian et al. |
| 6,463,289 B1 | 10/2002 | Havinis et al. |
| 6,477,581 B1 | 11/2002 | Carpenter et al. |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,501,421 B1 | 12/2002 | Duna et al. |

(56) References Cited

U.S. PATENT DOCUMENTS

| | | |
|---|---|---|
| 6,502,033 B1 | 12/2002 | Phuyal |
| 6,505,046 B1 | 1/2003 | Baker |
| 6,505,048 B1 | 1/2003 | Moles et al. |
| 6,505,123 B1 | 1/2003 | Root et al. |
| 6,507,802 B1 | 1/2003 | Payton et al. |
| 6,516,197 B2 | 2/2003 | Havinis et al. |
| 6,519,463 B2 | 2/2003 | Tendler |
| 6,519,571 B1 | 2/2003 | Guheen et al. |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |
| 6,542,819 B1 | 4/2003 | Kovacs et al. |
| 6,545,638 B2 | 4/2003 | Sladen |
| 6,546,336 B1 | 4/2003 | Matsuoka et al. |
| 6,546,360 B1 | 4/2003 | Gilbert et al. |
| 6,552,682 B1 | 4/2003 | Fan |
| 6,563,430 B1 | 5/2003 | Kemink et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,574,550 B2 | 6/2003 | Hashida |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,597,305 B2 | 7/2003 | Szeto et al. |
| 6,611,687 B1 | 8/2003 | Clark et al. |
| 6,611,788 B1 | 8/2003 | Hussa |
| 6,615,131 B1 | 9/2003 | Rennard et al. |
| 6,615,213 B1 | 9/2003 | Johnson |
| 6,643,587 B2 | 11/2003 | Brodie et al. |
| 6,647,257 B2 | 11/2003 | Owensby |
| 6,650,902 B1 | 11/2003 | Richton |
| 6,650,997 B2 | 11/2003 | Funk |
| 6,662,016 B1 | 12/2003 | Buckham et al. |
| 6,662,023 B1 | 12/2003 | Helle |
| 6,667,963 B1 | 12/2003 | Rantalainen et al. |
| 6,671,377 B1 | 12/2003 | Havinis et al. |
| 6,674,849 B1 | 1/2004 | Froeberg |
| 6,677,894 B2 | 1/2004 | Sheynblat et al. |
| 6,678,516 B2 | 1/2004 | Nordman et al. |
| 6,679,932 B2 | 1/2004 | Birler et al. |
| 6,680,694 B1 | 1/2004 | Knockeart et al. |
| 6,681,120 B1 | 1/2004 | Kim |
| 6,683,538 B1 | 1/2004 | Wilkes, Jr. |
| 6,697,018 B2 | 2/2004 | Stewart |
| 6,697,734 B1 | 2/2004 | Suomela |
| 6,711,408 B1 | 3/2004 | Raith |
| 6,711,474 B1 | 3/2004 | Treyz et al. |
| 6,714,791 B2 | 3/2004 | Friedman |
| 6,718,344 B2 | 4/2004 | Hirono |
| 6,721,572 B1 | 4/2004 | Smith et al. |
| 6,731,236 B1 | 5/2004 | Hager et al. |
| 6,731,238 B2 | 5/2004 | Johnson |
| 6,732,047 B1 | 5/2004 | de Silva |
| 6,738,808 B1 | 5/2004 | Zellner et al. |
| 6,741,188 B1 | 5/2004 | Miller et al. |
| 6,741,926 B1 | 5/2004 | Zhao et al. |
| 6,748,226 B1 | 6/2004 | Wortham |
| 6,748,318 B1 | 6/2004 | Jones |
| 6,750,883 B1 | 6/2004 | Parupudi et al. |
| 6,759,960 B2 | 7/2004 | Stewart |
| 6,762,772 B1 | 7/2004 | Imamura et al. |
| 6,766,174 B1 | 7/2004 | Kenyon |
| 6,766,245 B2 | 7/2004 | Padmanabhan |
| 6,781,575 B1 | 8/2004 | Hawkins et al. |
| 6,782,278 B2 | 8/2004 | Chen et al. |
| 6,789,012 B1 | 9/2004 | Childs et al. |
| 6,795,686 B2 | 9/2004 | Master et al. |
| 6,801,855 B1 | 10/2004 | Walters et al. |
| 6,810,323 B1 | 10/2004 | Bullock et al. |
| 6,813,501 B2 | 11/2004 | Kinnunen et al. |
| 6,813,503 B1 | 11/2004 | Zillikens et al. |
| 6,813,582 B2 | 11/2004 | Levi et al. |
| 6,816,782 B1 | 11/2004 | Walters et al. |
| 6,819,919 B1 | 11/2004 | Tanaka |
| 6,823,188 B1 | 11/2004 | Stern |
| 6,834,195 B2 | 12/2004 | Brandenberg et al. |
| 6,845,318 B1 | 1/2005 | Moore et al. |
| 6,847,891 B2 | 1/2005 | Pietras et al. |
| 6,847,969 B1 | 1/2005 | Mathai et al. |
| 6,853,911 B1 | 2/2005 | Sakarya |
| 6,853,917 B2 | 2/2005 | Miwa |
| 6,859,149 B1 | 2/2005 | Ohta |
| 6,865,483 B1 | 3/2005 | Cook, III et al. |
| 6,868,074 B1 | 3/2005 | Hanson |
| 6,871,144 B1 | 3/2005 | Lee |
| 6,879,838 B2 | 4/2005 | Rankin et al. |
| 6,882,313 B1 | 4/2005 | Fan et al. |
| 6,888,536 B2 | 5/2005 | Westerman et al. |
| 6,909,902 B1 | 6/2005 | Sawada et al. |
| 6,912,398 B1 | 6/2005 | Domnitz |
| 6,914,626 B2 | 7/2005 | Squibbs |
| 6,915,208 B2 | 7/2005 | Garin et al. |
| 6,931,322 B2 | 8/2005 | Jung et al. |
| 6,933,841 B2 | 8/2005 | Muramatsu et al. |
| 6,941,222 B2 | 9/2005 | Yano et al. |
| 6,944,447 B2 | 9/2005 | Portman et al. |
| 6,948,656 B2 | 9/2005 | Williams |
| 6,950,746 B2 | 9/2005 | Yano et al. |
| 6,952,181 B2 | 10/2005 | Karr et al. |
| 6,954,646 B2 | 10/2005 | Churt |
| 6,954,735 B1 | 10/2005 | Djupsjobacka et al. |
| 6,957,072 B2 | 10/2005 | Kangras et al. |
| 6,975,959 B2 | 12/2005 | Dietrich et al. |
| 6,980,909 B2 | 12/2005 | Root et al. |
| 6,990,495 B1 | 1/2006 | Grason et al. |
| 6,999,779 B1 | 2/2006 | Hashimoto |
| 7,003,289 B1 | 2/2006 | Kolls |
| 7,009,556 B2 | 3/2006 | Stewart |
| 7,031,725 B2 | 4/2006 | Rorabaugh |
| 7,044,372 B2 | 5/2006 | Okuda et al. |
| 7,058,594 B2 | 6/2006 | Stewart |
| 7,069,319 B2 | 6/2006 | Zellner et al. |
| 7,076,255 B2 | 7/2006 | Parupudi et al. |
| 7,082,365 B2 | 7/2006 | Sheha et al. |
| 7,089,264 B1 | 8/2006 | Guido et al. |
| 7,096,029 B1 | 8/2006 | Parupudi et al. |
| 7,096,030 B2 | 8/2006 | Huomo |
| 7,103,470 B2 | 9/2006 | Mintz |
| 7,103,472 B2 | 9/2006 | Itabashi |
| 7,117,015 B2 | 10/2006 | Scheinert et al. |
| 7,120,469 B1 | 10/2006 | Urakawa |
| 7,123,189 B2 | 10/2006 | Lalik et al. |
| 7,123,926 B2 | 10/2006 | Himmelstein |
| 7,130,630 B1 | 10/2006 | Enzmann et al. |
| 7,130,743 B2 | 10/2006 | Kudo et al. |
| 7,136,853 B1 | 11/2006 | Kohda et al. |
| 7,146,298 B2 | 12/2006 | Matomedi et al. |
| 7,149,503 B2 | 12/2006 | Aarnio et al. |
| 7,151,921 B2 | 12/2006 | Otsuka |
| 7,165,725 B2 | 1/2007 | Casey |
| 7,171,190 B2 | 1/2007 | Ye et al. |
| 7,181,189 B2 | 2/2007 | Hotta et al. |
| 7,187,997 B2 | 3/2007 | Johnson |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,222,293 B1 | 5/2007 | Zapiec et al. |
| 7,236,883 B2 | 6/2007 | Garin et al. |
| 7,254,481 B2 | 8/2007 | Yamada et al. |
| 7,256,711 B2 | 8/2007 | Sheha et al. |
| 7,257,392 B2 | 8/2007 | Tang et al. |
| 7,260,378 B2 | 8/2007 | Holland et al. |
| 7,266,376 B2 | 9/2007 | Nakagawa |
| 7,269,601 B2 | 9/2007 | Kinno et al. |
| 7,271,765 B2 | 9/2007 | Stilp et al. |
| 7,272,403 B2 | 9/2007 | Creamer et al. |
| 7,272,404 B2 | 9/2007 | Overy et al. |
| 7,274,332 B1 | 9/2007 | Dupray |
| 7,274,939 B2 | 9/2007 | Ruutu et al. |

(56) References Cited

U.S. PATENT DOCUMENTS

| | | |
|---|---|---|
| 7,280,822 B2 | 10/2007 | Fraccaroli |
| 7,286,933 B2 | 10/2007 | Cho |
| 7,295,556 B2 | 11/2007 | Roese et al. |
| 7,295,925 B2 | 11/2007 | Breed et al. |
| 7,298,327 B2 | 11/2007 | Dupray et al. |
| 7,299,008 B2 | 11/2007 | Gluck |
| 7,310,516 B1 | 12/2007 | Vacanti et al. |
| 7,313,405 B2 | 12/2007 | Tanabe |
| 7,313,467 B2 | 12/2007 | Breed et al. |
| 7,319,412 B1 | 1/2008 | Coppinger et al. |
| 7,336,928 B2 | 2/2008 | Paalasmaa et al. |
| 7,336,949 B2 | 2/2008 | Nasielski |
| 7,339,496 B2 | 3/2008 | Endo et al. |
| 7,343,564 B2 | 3/2008 | Othmer |
| 7,349,706 B2 | 3/2008 | Kim et al. |
| 7,353,034 B2 | 4/2008 | Haney |
| 7,359,713 B1 | 4/2008 | Tiwari |
| 7,370,283 B2 | 5/2008 | Othmer |
| 7,373,246 B2 | 5/2008 | O'Clair |
| 7,386,396 B2 | 6/2008 | Johnson |
| 7,389,179 B2 | 6/2008 | Jin et al. |
| 7,392,017 B2 | 6/2008 | Chu et al. |
| 7,395,031 B1 | 7/2008 | Ritter |
| 7,418,402 B2 | 8/2008 | McCrossin et al. |
| 7,421,422 B1 | 9/2008 | Dempster et al. |
| 7,421,486 B1 | 9/2008 | Parupudi et al. |
| 7,426,437 B2 | 9/2008 | Breed et al. |
| 7,427,021 B2 | 9/2008 | Kemper et al. |
| 7,433,694 B2 | 10/2008 | Morgan et al. |
| 7,440,842 B1 | 10/2008 | Vorona |
| 7,441,203 B2 | 10/2008 | Othmer et al. |
| 7,466,235 B1 | 12/2008 | Kolb et al. |
| 7,483,944 B2 | 1/2009 | Parupudi et al. |
| 7,486,201 B2 | 2/2009 | Kelly et al. |
| 7,496,444 B1 | 2/2009 | Fried et al. |
| 7,500,607 B2 | 3/2009 | Williams |
| 7,512,487 B1 | 3/2009 | Golding et al. |
| 7,522,927 B2 | 4/2009 | Fitch et al. |
| 7,525,484 B2 | 4/2009 | Dupray et al. |
| 7,536,388 B2 | 5/2009 | Jung et al. |
| 7,545,281 B2 | 6/2009 | Richards et al. |
| 7,558,696 B2 | 7/2009 | Vilppula et al. |
| 7,565,132 B2 | 7/2009 | Ben Ayed |
| 7,565,157 B1 | 7/2009 | Ortega et al. |
| 7,574,222 B2 | 8/2009 | Sawada et al. |
| 7,577,448 B2 | 8/2009 | Pande et al. |
| 7,587,345 B2 | 9/2009 | Mann et al. |
| 7,593,740 B2 | 9/2009 | Crowley et al. |
| 7,593,991 B2 | 9/2009 | Friedman et al. |
| 7,596,450 B2 | 9/2009 | Hong |
| 7,599,795 B1 | 10/2009 | Blumberg et al. |
| 7,603,233 B2 | 10/2009 | Tashiro |
| 7,606,580 B2 | 10/2009 | Granito et al. |
| 7,617,044 B2 | 11/2009 | Lee |
| 7,620,404 B2 | 11/2009 | Chesnais et al. |
| 7,623,848 B2 | 11/2009 | Rosenfelt et al. |
| 7,624,358 B2 | 11/2009 | Kim et al. |
| 7,647,174 B2 | 1/2010 | Kwon |
| 7,680,591 B2 | 3/2010 | Nagata et al. |
| 7,683,893 B2 | 3/2010 | Kim et al. |
| 7,689,916 B1 | 3/2010 | Goel et al. |
| 7,710,290 B2 | 5/2010 | Johnson |
| 7,711,478 B2 | 5/2010 | Gluck |
| 7,714,778 B2 | 5/2010 | Dupray |
| 7,729,691 B2 | 6/2010 | Newville |
| 7,739,040 B2 | 6/2010 | Horvitz |
| 7,742,774 B2 | 6/2010 | Oh et al. |
| 7,743,074 B1 | 6/2010 | Parupudi et al. |
| 7,756,639 B2 | 7/2010 | Colley et al. |
| 7,768,395 B2 | 8/2010 | Gold |
| 7,783,421 B2 | 8/2010 | Arai et al. |
| 7,792,273 B2 | 9/2010 | Fano et al. |
| 7,811,203 B2 | 10/2010 | Unuma et al. |
| 7,822,547 B2 | 10/2010 | Lindroos |
| 7,840,347 B2 | 11/2010 | Noguchi |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,089 B1 | 2/2011 | Fujisaki |
| 7,890,123 B2 | 2/2011 | Granito et al. |
| 7,929,010 B2 | 4/2011 | Narasimhan |
| 7,933,612 B2 | 4/2011 | Counts et al. |
| 7,933,929 B1 | 4/2011 | McClendon et al. |
| 7,941,188 B2 | 5/2011 | Jung et al. |
| 7,962,280 B2 | 6/2011 | Kindo et al. |
| 7,991,432 B2 | 8/2011 | Silverbrook et al. |
| 8,031,050 B2 | 10/2011 | Johnson |
| 8,036,630 B2 | 10/2011 | Park et al. |
| 8,046,009 B2 | 10/2011 | Bodmer et al. |
| RE42,927 E | 11/2011 | Want et al. |
| 8,073,565 B2 | 12/2011 | Johnson |
| 8,082,094 B2 | 12/2011 | Gao |
| 8,095,152 B2 | 1/2012 | Sheha et al. |
| 8,108,144 B2 | 1/2012 | Forstall et al. |
| 8,229,458 B2 | 7/2012 | Busch |
| 8,250,634 B2 | 8/2012 | Agarwal et al. |
| 8,332,878 B2 | 12/2012 | Harm |
| 8,385,946 B2 | 2/2013 | Forstall et al. |
| 8,386,655 B2 | 2/2013 | Luers |
| 8,538,685 B2 | 9/2013 | Johnson |
| 8,762,056 B2 | 6/2014 | Forstall et al. |
| 8,774,825 B2 | 7/2014 | Forstall et al. |
| 8,963,686 B2 | 2/2015 | Johnson |
| 9,066,199 B2 | 6/2015 | Forstall et al. |
| 9,100,793 B2 | 8/2015 | Johnson |
| 9,109,904 B2 | 8/2015 | Forstall et al. |
| 9,250,092 B2 | 2/2016 | Blumenberg et al. |
| 9,310,206 B2 | 4/2016 | Forshall et al. |
| 9,317,867 B2 | 4/2016 | Johnson |
| 9,891,055 B2 * | 2/2018 | Forstall .......... G01C 21/20 |
| 2001/0018349 A1 | 8/2001 | Kinnunen et al. |
| 2001/0043148 A1 | 11/2001 | Stewart |
| 2001/0046884 A1 | 11/2001 | Yoshioka |
| 2002/0026289 A1 | 2/2002 | Kuzunuki et al. |
| 2002/0030698 A1 | 3/2002 | Baur et al. |
| 2002/0032035 A1 | 3/2002 | Teshima |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0055373 A1 | 5/2002 | King et al. |
| 2002/0067353 A1 | 6/2002 | Kenyon et al. |
| 2002/0077144 A1 | 6/2002 | Keller et al. |
| 2002/0087505 A1 | 7/2002 | Smith et al. |
| 2002/0091632 A1 | 7/2002 | Turock et al. |
| 2002/0091991 A1 | 7/2002 | Castro |
| 2002/0095486 A1 | 7/2002 | Bahl |
| 2002/0098849 A1 | 7/2002 | Bloebaum et al. |
| 2002/0118112 A1 | 8/2002 | Lang |
| 2002/0126146 A1 | 9/2002 | Burns et al. |
| 2002/0128773 A1 | 9/2002 | Chowanic et al. |
| 2002/0132625 A1 | 9/2002 | Ogino et al. |
| 2002/0140560 A1 | 10/2002 | Altman et al. |
| 2002/0160815 A1 | 10/2002 | Patel et al. |
| 2002/0164999 A1 | 11/2002 | Johnson |
| 2002/0167442 A1 | 11/2002 | Taylor |
| 2002/0173905 A1 | 11/2002 | Jin et al. |
| 2002/0183927 A1 | 12/2002 | Odamura |
| 2003/0001827 A1 | 1/2003 | Yokota et al. |
| 2003/0006914 A1 | 1/2003 | Todoriki et al. |
| 2003/0008662 A1 | 1/2003 | Stern et al. |
| 2003/0014181 A1 | 1/2003 | Myr |
| 2003/0016804 A1 | 1/2003 | Sheha et al. |
| 2003/0032404 A1 | 2/2003 | Wager et al. |
| 2003/0055560 A1 | 3/2003 | Phillips et al. |
| 2003/0060211 A1 | 3/2003 | Chern et al. |
| 2003/0060212 A1 | 3/2003 | Thomas |
| 2003/0060215 A1 | 3/2003 | Graham |
| 2003/0060973 A1 | 3/2003 | Mathews et al. |
| 2003/0060976 A1 | 3/2003 | Sato et al. |
| 2003/0065934 A1 | 4/2003 | Angelo et al. |
| 2003/0069029 A1 | 4/2003 | Dowling et al. |

(56) References Cited

U.S. PATENT DOCUMENTS

| | | |
|---|---|---|
| 2003/0069683 A1 | 4/2003 | Lapidot et al. |
| 2003/0078054 A1 | 4/2003 | Okuda |
| 2003/0078055 A1 | 4/2003 | Smith et al. |
| 2003/0078057 A1 | 4/2003 | Watanabe et al. |
| 2003/0093217 A1 | 5/2003 | Petzold et al. |
| 2003/0096620 A1 | 5/2003 | Ozturk et al. |
| 2003/0100326 A1 | 5/2003 | Grube et al. |
| 2003/0100334 A1 | 5/2003 | Mazzara, Jr. |
| 2003/0101225 A1 | 5/2003 | Han et al. |
| 2003/0105826 A1 | 6/2003 | Mayraz |
| 2003/0120423 A1 | 6/2003 | Cochlovius et al. |
| 2003/0134657 A1 | 7/2003 | Norta et al. |
| 2003/0139150 A1 | 7/2003 | Rodriguez et al. |
| 2003/0140136 A1 | 7/2003 | Nakamura |
| 2003/0144793 A1 | 7/2003 | Melaku et al. |
| 2003/0148774 A1 | 8/2003 | Naghian et al. |
| 2003/0158655 A1 | 8/2003 | Obradovich et al. |
| 2003/0191578 A1 | 10/2003 | Paulauskas et al. |
| 2003/0229446 A1 | 12/2003 | Boscamp et al. |
| 2003/0236106 A1 | 12/2003 | Master et al. |
| 2004/0010358 A1 | 1/2004 | Oesterling et al. |
| 2004/0019582 A1 | 1/2004 | Brown |
| 2004/0036649 A1 | 2/2004 | Taylor |
| 2004/0054428 A1 | 3/2004 | Sheha et al. |
| 2004/0059502 A1 | 3/2004 | Levi et al. |
| 2004/0068439 A1 | 4/2004 | Elgrably |
| 2004/0072557 A1 | 4/2004 | Paila et al. |
| 2004/0072577 A1 | 4/2004 | Myllymaki et al. |
| 2004/0073361 A1 | 4/2004 | Tzamaloukas et al. |
| 2004/0082351 A1 | 4/2004 | Westman |
| 2004/0083050 A1 | 4/2004 | Biyani |
| 2004/0093155 A1 | 5/2004 | Simonds |
| 2004/0093392 A1 | 5/2004 | Nagamatsu et al. |
| 2004/0093566 A1 | 5/2004 | McElligott |
| 2004/0098175 A1 | 5/2004 | Said et al. |
| 2004/0104842 A1 | 6/2004 | Drury et al. |
| 2004/0110488 A1 | 6/2004 | Komsi |
| 2004/0110515 A1 | 6/2004 | Blumberg et al. |
| 2004/0128066 A1 | 7/2004 | Kudo et al. |
| 2004/0128067 A1 | 7/2004 | Smith |
| 2004/0137893 A1 | 7/2004 | Muthuswamy et al. |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0180669 A1 | 9/2004 | Kall |
| 2004/0192299 A1 | 9/2004 | Wilson et al. |
| 2004/0192351 A1 | 9/2004 | Duncan |
| 2004/0198335 A1 | 10/2004 | Campen |
| 2004/0198379 A1 | 10/2004 | Magee et al. |
| 2004/0198397 A1 | 10/2004 | Weiss |
| 2004/0203569 A1 | 10/2004 | Jijina et al. |
| 2004/0203746 A1 | 10/2004 | Knauerhase et al. |
| 2004/0203836 A1 | 10/2004 | Gorday et al. |
| 2004/0203880 A1 | 10/2004 | Riley |
| 2004/0203909 A1 | 10/2004 | Koster |
| 2004/0204842 A1 | 10/2004 | Shinozaki |
| 2004/0215707 A1 | 10/2004 | Fujita et al. |
| 2004/0225436 A1 | 11/2004 | Yoshihashi |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260457 A1 | 12/2004 | Kawase et al. |
| 2004/0260939 A1 | 12/2004 | Ichikawa et al. |
| 2004/0263084 A1 | 12/2004 | Mor et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0009511 A1 | 1/2005 | Bostrom et al. |
| 2005/0020223 A1 | 1/2005 | Ellis et al. |
| 2005/0020315 A1 | 1/2005 | Robertson et al. |
| 2005/0027442 A1 | 2/2005 | Kelley et al. |
| 2005/0033509 A1 | 2/2005 | Clapper |
| 2005/0033515 A1 | 2/2005 | Bozzone |
| 2005/0037781 A1 | 2/2005 | Ozugur et al. |
| 2005/0039140 A1 | 2/2005 | Chen |
| 2005/0046584 A1 | 3/2005 | Breed |
| 2005/0071078 A1 | 3/2005 | Yamada et al. |
| 2005/0071702 A1 | 3/2005 | Morisawa |
| 2005/0075116 A1 | 4/2005 | Laird |
| 2005/0085272 A1 | 4/2005 | Anderson et al. |
| 2005/0091408 A1 | 4/2005 | Parupudi et al. |
| 2005/0096840 A1 | 5/2005 | Simske |
| 2005/0114021 A1 | 5/2005 | Krull et al. |
| 2005/0130677 A1 | 6/2005 | Meunier et al. |
| 2005/0134440 A1 | 6/2005 | Breed |
| 2005/0134578 A1 | 6/2005 | Chambers et al. |
| 2005/0149250 A1 | 7/2005 | Isaac |
| 2005/0153681 A1 | 7/2005 | Hanson |
| 2005/0176411 A1 | 8/2005 | Taya |
| 2005/0186954 A1 | 8/2005 | Kenney |
| 2005/0190789 A1 | 9/2005 | Salkini et al. |
| 2005/0192025 A1 | 9/2005 | Kaplan |
| 2005/0197767 A1 | 9/2005 | Nortrup |
| 2005/0203698 A1 | 9/2005 | Lee |
| 2005/0216184 A1 | 9/2005 | Ehlers |
| 2005/0221799 A1 | 10/2005 | Tervo et al. |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0222763 A1 | 10/2005 | Uyeki |
| 2005/0227709 A1 | 10/2005 | Chang et al. |
| 2005/0228553 A1 | 10/2005 | Tryon |
| 2005/0228860 A1 | 10/2005 | Hamynen et al. |
| 2005/0234637 A1 | 10/2005 | Obradovich et al. |
| 2005/0239477 A1 | 10/2005 | Kim et al. |
| 2005/0250440 A1 | 11/2005 | Zhou et al. |
| 2005/0256639 A1 | 11/2005 | Aleksic et al. |
| 2005/0267676 A1 | 12/2005 | Nezu et al. |
| 2005/0272473 A1 | 12/2005 | Sheena et al. |
| 2005/0286421 A1 | 12/2005 | Janacek |
| 2006/0009908 A1 | 1/2006 | Tomita et al. |
| 2006/0015249 A1 | 1/2006 | Gieseke |
| 2006/0022048 A1 | 2/2006 | Johnson |
| 2006/0025158 A1 | 2/2006 | Leblanc et al. |
| 2006/0026536 A1 | 2/2006 | Hotelling et al. |
| 2006/0029109 A1 | 2/2006 | Moran |
| 2006/0038719 A1 | 2/2006 | Pande et al. |
| 2006/0041374 A1 | 2/2006 | Inoue |
| 2006/0041377 A1 | 2/2006 | Jung et al. |
| 2006/0041378 A1 | 2/2006 | Cheng et al. |
| 2006/0056388 A1 | 3/2006 | Livingwood |
| 2006/0058955 A1 | 3/2006 | Mehren |
| 2006/0063539 A1 | 3/2006 | Beyer, Jr. |
| 2006/0064239 A1 | 3/2006 | Ishii |
| 2006/0068809 A1 | 3/2006 | Wengler et al. |
| 2006/0069503 A1 | 3/2006 | Suomela |
| 2006/0072542 A1 | 4/2006 | Sinnreich et al. |
| 2006/0084414 A1 | 4/2006 | Alberth, Jr. et al. |
| 2006/0085392 A1 | 4/2006 | Wang et al. |
| 2006/0094353 A1 | 5/2006 | Neilsen et al. |
| 2006/0101005 A1 | 5/2006 | Yang et al. |
| 2006/0111122 A1 | 5/2006 | Carlson et al. |
| 2006/0116137 A1 | 6/2006 | Jung |
| 2006/0116965 A1 | 6/2006 | Kudo et al. |
| 2006/0148463 A1 | 7/2006 | Zhu et al. |
| 2006/0149461 A1 | 7/2006 | Rowley |
| 2006/0150119 A1 | 7/2006 | Chesnais et al. |
| 2006/0156209 A1 | 7/2006 | Matsuura et al. |
| 2006/0166679 A1 | 7/2006 | Karaoguz et al. |
| 2006/0168300 A1 | 7/2006 | An et al. |
| 2006/0172769 A1 | 8/2006 | Oh |
| 2006/0172778 A1 | 8/2006 | Sundararajan et al. |
| 2006/0179114 A1 | 8/2006 | Deeds |
| 2006/0180649 A1 | 8/2006 | Casey |
| 2006/0183486 A1 | 8/2006 | Mullen |
| 2006/0184320 A1 | 8/2006 | Hong |
| 2006/0184978 A1 | 8/2006 | Casey |
| 2006/0195481 A1 | 8/2006 | Arrouye et al. |
| 2006/0199567 A1 | 9/2006 | Alston |
| 2006/0199612 A1 | 9/2006 | Beyer et al. |

(56) References Cited

U.S. PATENT DOCUMENTS

| | | |
|---|---|---|
| 2006/0202819 A1 | 9/2006 | Adamczyk et al. |
| 2006/0206264 A1 | 9/2006 | Rasmussen |
| 2006/0211453 A1 | 9/2006 | Schick |
| 2006/0218209 A1 | 9/2006 | Arrouye et al. |
| 2006/0223518 A1 | 10/2006 | Haney |
| 2006/0227047 A1 | 10/2006 | Rosenberg |
| 2006/0229802 A1 | 10/2006 | Vertelney et al. |
| 2006/0229889 A1 | 10/2006 | Hodjat et al. |
| 2006/0247855 A1 | 11/2006 | de Silva et al. |
| 2006/0251034 A1 | 11/2006 | Park |
| 2006/0270421 A1 | 11/2006 | Phillips et al. |
| 2006/0271280 A1 | 11/2006 | O'Clair |
| 2006/0284767 A1 | 12/2006 | Taylor |
| 2006/0286971 A1 | 12/2006 | Maly et al. |
| 2006/0287824 A1 | 12/2006 | Lin |
| 2006/0291639 A1 | 12/2006 | Radziewicz et al. |
| 2006/0293029 A1 | 12/2006 | Jha et al. |
| 2006/0293083 A1 | 12/2006 | Bowen |
| 2007/0001875 A1 | 1/2007 | Taylor |
| 2007/0003040 A1 | 1/2007 | Radziewicz et al. |
| 2007/0005188 A1 | 1/2007 | Johnson |
| 2007/0005233 A1 | 1/2007 | Pinkus et al. |
| 2007/0006098 A1 | 1/2007 | Krumm et al. |
| 2007/0008515 A1 | 1/2007 | Otani et al. |
| 2007/0010942 A1 | 1/2007 | Bill |
| 2007/0016362 A1 | 1/2007 | Nelson |
| 2007/0027614 A1 | 2/2007 | Reeser et al. |
| 2007/0027628 A1 | 2/2007 | Geelen |
| 2007/0038364 A1 | 2/2007 | Lee et al. |
| 2007/0038369 A1 | 2/2007 | Devries et al. |
| 2007/0042790 A1 | 2/2007 | Mohi et al. |
| 2007/0055684 A1 | 3/2007 | Stevens |
| 2007/0060328 A1 | 3/2007 | Zrike et al. |
| 2007/0061245 A1 | 3/2007 | Ramer et al. |
| 2007/0061301 A1 | 3/2007 | Ramer et al. |
| 2007/0061363 A1 | 3/2007 | Ramer et al. |
| 2007/0071114 A1 | 3/2007 | Sanderford et al. |
| 2007/0073480 A1 | 3/2007 | Singh |
| 2007/0073719 A1 | 3/2007 | Ramer et al. |
| 2007/0087726 A1 | 4/2007 | McGary et al. |
| 2007/0093258 A1 | 4/2007 | Steenstra et al. |
| 2007/0093955 A1 | 4/2007 | Hughes |
| 2007/0106465 A1 | 5/2007 | Adam et al. |
| 2007/0106466 A1 | 5/2007 | Noguchi |
| 2007/0109323 A1 | 5/2007 | Nakashima |
| 2007/0115868 A1 | 5/2007 | Chen et al. |
| 2007/0123280 A1 | 5/2007 | McGary et al. |
| 2007/0124043 A1 | 5/2007 | Ayoub et al. |
| 2007/0124058 A1 | 5/2007 | Kitagawa et al. |
| 2007/0124066 A1 | 5/2007 | Kikuchi et al. |
| 2007/0127439 A1 | 6/2007 | Stein |
| 2007/0127661 A1 | 6/2007 | Didcock |
| 2007/0129888 A1 | 6/2007 | Rosenberg |
| 2007/0130153 A1 | 6/2007 | Nachman et al. |
| 2007/0135136 A1 | 6/2007 | Ische |
| 2007/0135990 A1 | 6/2007 | Seymour et al. |
| 2007/0142026 A1 | 6/2007 | Kuz et al. |
| 2007/0146342 A1 | 6/2007 | Medler et al. |
| 2007/0149212 A1 | 6/2007 | Gupta et al. |
| 2007/0150174 A1 | 6/2007 | Seymour et al. |
| 2007/0150192 A1 | 6/2007 | Wakamatsu et al. |
| 2007/0150320 A1 | 6/2007 | Huang |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0155360 A1 | 7/2007 | An |
| 2007/0155404 A1 | 7/2007 | Yamane et al. |
| 2007/0156326 A1 | 7/2007 | Nesbitt |
| 2007/0156337 A1 | 7/2007 | Yanni |
| 2007/0162224 A1 | 7/2007 | Luo |
| 2007/0179854 A1 | 8/2007 | Ziv et al. |
| 2007/0184855 A1 | 8/2007 | Klassen |
| 2007/0191029 A1 | 8/2007 | Zarem et al. |
| 2007/0198304 A1 | 8/2007 | Cohen et al. |
| 2007/0200713 A1 | 8/2007 | Weber et al. |
| 2007/0202887 A1 | 8/2007 | Counts et al. |
| 2007/0204162 A1 | 8/2007 | Rodriguez |
| 2007/0204218 A1 | 8/2007 | Weber et al. |
| 2007/0206730 A1 | 9/2007 | Polk |
| 2007/0208492 A1 | 9/2007 | Downs et al. |
| 2007/0208497 A1 | 9/2007 | Downs et al. |
| 2007/0208498 A1 | 9/2007 | Barker et al. |
| 2007/0208507 A1 | 9/2007 | Gotoh |
| 2007/0218925 A1 | 9/2007 | Islam et al. |
| 2007/0219706 A1 | 9/2007 | Sheynblat |
| 2007/0219708 A1 | 9/2007 | Brasche et al. |
| 2007/0229549 A1 | 10/2007 | Dicke et al. |
| 2007/0232272 A1 | 10/2007 | Gonsalves et al. |
| 2007/0232326 A1 | 10/2007 | Johnson |
| 2007/0233387 A1 | 10/2007 | Johnson |
| 2007/0237096 A1 | 10/2007 | Vengroff et al. |
| 2007/0238491 A1 | 10/2007 | He |
| 2007/0243853 A1 | 10/2007 | Bumiller et al. |
| 2007/0247435 A1 | 10/2007 | Benko et al. |
| 2007/0254676 A1 | 11/2007 | Pedigo et al. |
| 2007/0259674 A1 | 11/2007 | Neef et al. |
| 2007/0260751 A1 | 11/2007 | Meesseman |
| 2007/0266116 A1 | 11/2007 | Rensin et al. |
| 2007/0270159 A1 | 11/2007 | Lohtia et al. |
| 2007/0271328 A1 | 11/2007 | Geelen et al. |
| 2007/0276586 A1 | 11/2007 | Jeon et al. |
| 2007/0276587 A1 | 11/2007 | Johnson |
| 2007/0276596 A1 | 11/2007 | Solomon et al. |
| 2007/0281664 A1 | 12/2007 | Kaneko et al. |
| 2007/0282521 A1 | 12/2007 | Broughton |
| 2007/0282565 A1 | 12/2007 | Bye et al. |
| 2007/0290920 A1 | 12/2007 | Shintai et al. |
| 2007/0296573 A1 | 12/2007 | Schlesier et al. |
| 2007/0299601 A1 | 12/2007 | Zhao et al. |
| 2008/0004789 A1 | 1/2008 | Horvitz et al. |
| 2008/0004791 A1 | 1/2008 | Sera |
| 2008/0004802 A1 | 1/2008 | Horvitz |
| 2008/0005104 A1 | 1/2008 | Flake et al. |
| 2008/0005301 A1 | 1/2008 | Li et al. |
| 2008/0015422 A1 | 1/2008 | Wessel |
| 2008/0019335 A1 | 1/2008 | Wallace et al. |
| 2008/0021632 A1 | 1/2008 | Amano |
| 2008/0024360 A1 | 1/2008 | Taylor |
| 2008/0024364 A1 | 1/2008 | Taylor |
| 2008/0027636 A1 | 1/2008 | Tengler et al. |
| 2008/0030308 A1 | 2/2008 | Johnson |
| 2008/0032703 A1 | 2/2008 | Krumm et al. |
| 2008/0032721 A1 | 2/2008 | MacDonald et al. |
| 2008/0045234 A1 | 2/2008 | Reed |
| 2008/0046176 A1 | 2/2008 | Jurgens |
| 2008/0052407 A1 | 2/2008 | Baudino et al. |
| 2008/0055154 A1 | 3/2008 | Martucci et al. |
| 2008/0065311 A1 | 3/2008 | Bauchot et al. |
| 2008/0070593 A1 | 3/2008 | Altman et al. |
| 2008/0071466 A1 | 3/2008 | Downs et al. |
| 2008/0082254 A1 | 4/2008 | Huhtala et al. |
| 2008/0085727 A1 | 4/2008 | Kratz |
| 2008/0086240 A1 | 4/2008 | Breed |
| 2008/0086455 A1 | 4/2008 | Meisels et al. |
| 2008/0088486 A1 | 4/2008 | Rozum et al. |
| 2008/0091347 A1 | 4/2008 | Tashiro |
| 2008/0096518 A1 | 4/2008 | Mock et al. |
| 2008/0097698 A1 | 4/2008 | Arnold-Huyser et al. |
| 2008/0098090 A1 | 4/2008 | Geraci et al. |
| 2008/0104634 A1 | 5/2008 | Gajdos et al. |
| 2008/0109153 A1 | 5/2008 | Gueziec |
| 2008/0113672 A1 | 5/2008 | Karr et al. |
| 2008/0119200 A1 | 5/2008 | McConnel |
| 2008/0129528 A1 | 6/2008 | Guthrie |
| 2008/0132243 A1 | 6/2008 | Spalink et al. |
| 2008/0132251 A1 | 6/2008 | Altman et al. |
| 2008/0132252 A1 | 6/2008 | Altman et al. |
| 2008/0140308 A1 | 6/2008 | Yamane et al. |
| 2008/0140520 A1 | 6/2008 | Hyder et al. |
| 2008/0153512 A1 | 6/2008 | Kale et al. |
| 2008/0153513 A1 | 6/2008 | Flake et al. |
| 2008/0155453 A1 | 6/2008 | Othmer |
| 2008/0160956 A1 | 7/2008 | Jackson et al. |
| 2008/0161034 A1 | 7/2008 | Akiyama |

(56) References Cited

U.S. PATENT DOCUMENTS

| | | |
|---|---|---|
| 2008/0167078 A1 | 7/2008 | Eibye |
| 2008/0167083 A1 | 7/2008 | Wyld et al. |
| 2008/0167796 A1 | 7/2008 | Narayanaswami |
| 2008/0167811 A1 | 7/2008 | Geelen |
| 2008/0168347 A1 | 7/2008 | Hallyn |
| 2008/0172173 A1 | 7/2008 | Chang et al. |
| 2008/0172361 A1 | 7/2008 | Wong et al. |
| 2008/0172374 A1 | 7/2008 | Wolosin et al. |
| 2008/0176545 A1 | 7/2008 | Dicke et al. |
| 2008/0177793 A1 | 7/2008 | Epstein et al. |
| 2008/0178116 A1 | 7/2008 | Kim |
| 2008/0186162 A1 | 8/2008 | Rajan et al. |
| 2008/0189033 A1 | 8/2008 | Geelen et al. |
| 2008/0194273 A1 | 8/2008 | Kansal et al. |
| 2008/0200142 A1 | 8/2008 | Abdel-Kader et al. |
| 2008/0207167 A1 | 8/2008 | Bugenhagen |
| 2008/0209344 A1 | 8/2008 | Knapp et al. |
| 2008/0225779 A1 | 9/2008 | Bragiel et al. |
| 2008/0227473 A1 | 9/2008 | Haney |
| 2008/0233919 A1 | 9/2008 | Kenney |
| 2008/0242312 A1 | 10/2008 | Paulson et al. |
| 2008/0248815 A1 | 10/2008 | Busch |
| 2008/0249667 A1 | 10/2008 | Horvitz et al. |
| 2008/0249983 A1 | 10/2008 | Meisels et al. |
| 2008/0268876 A1 | 10/2008 | Gelfand et al. |
| 2008/0271072 A1 | 10/2008 | Rothschild et al. |
| 2008/0280600 A1 | 11/2008 | Zhou |
| 2008/0284642 A1 | 11/2008 | Seacat et al. |
| 2008/0287124 A1 | 11/2008 | Karabinis |
| 2008/0288166 A1 | 11/2008 | Onishi |
| 2008/0293397 A1 | 11/2008 | Gajdos et al. |
| 2008/0301144 A1 | 12/2008 | Boss et al. |
| 2008/0310850 A1 | 12/2008 | Pederson et al. |
| 2008/0318550 A1 | 12/2008 | DeAtley |
| 2008/0319644 A1 | 12/2008 | Zehler |
| 2008/0319652 A1 | 12/2008 | Moshfeghi |
| 2009/0003659 A1 | 1/2009 | Forstall et al. |
| 2009/0005005 A1 | 1/2009 | Forstall et al. |
| 2009/0005018 A1 | 1/2009 | Forstall et al. |
| 2009/0005021 A1 | 1/2009 | Forstall et al. |
| 2009/0005068 A1 | 1/2009 | Forstall et al. |
| 2009/0005070 A1 | 1/2009 | Forstall et al. |
| 2009/0005071 A1 | 1/2009 | Forstall et al. |
| 2009/0005072 A1 | 1/2009 | Forstall et al. |
| 2009/0005076 A1 | 1/2009 | Forstall et al. |
| 2009/0005080 A1 | 1/2009 | Forstall et al. |
| 2009/0005082 A1 | 1/2009 | Forstall et al. |
| 2009/0005964 A1 | 1/2009 | Forstall et al. |
| 2009/0005965 A1 | 1/2009 | Forstall et al. |
| 2009/0005975 A1 | 1/2009 | Forstall et al. |
| 2009/0005978 A1 | 1/2009 | Forstall et al. |
| 2009/0005981 A1 | 1/2009 | Forstall et al. |
| 2009/0006336 A1 | 1/2009 | Forstall et al. |
| 2009/0030605 A1 | 1/2009 | Breed |
| 2009/0031006 A1 | 1/2009 | Johnson |
| 2009/0033540 A1 | 2/2009 | Breed et al. |
| 2009/0042585 A1 | 2/2009 | Matsuda |
| 2009/0228961 A1 | 9/2009 | Wald et al. |
| 2009/0234743 A1 | 9/2009 | Wald et al. |
| 2009/0259573 A1 | 10/2009 | Cheng et al. |
| 2009/0271271 A1 | 10/2009 | Johnson |
| 2010/0082820 A1 | 4/2010 | Furukawa |
| 2010/0106397 A1 | 4/2010 | Van Essen |
| 2010/0128935 A1 | 5/2010 | Filley et al. |
| 2010/0131584 A1 | 5/2010 | Johnson |
| 2010/0173647 A1 | 7/2010 | Sheynblat |
| 2010/0207782 A1 | 8/2010 | Johnson |
| 2010/0285817 A1 | 11/2010 | Zhao et al. |
| 2011/0051658 A1 | 3/2011 | Jin et al. |
| 2011/0159887 A1 | 6/2011 | Lohtia et al. |
| 2011/0276591 A1 | 11/2011 | Bliss et al. |
| 2012/0270567 A1 | 10/2012 | Johnson |
| 2013/0225203 A1 | 8/2013 | Johnson |
| 2014/0066100 A1 | 3/2014 | Johnson |
| 2019/0069268 A1 | 2/2019 | Forstall et al. |

FOREIGN PATENT DOCUMENTS

| | | |
|---|---|---|
| CA | 2287596 | 4/2000 |
| CA | 2432239 | 12/2004 |
| CN | 1 412 573 | 4/2003 |
| DE | 3 621 456 | 1/1988 |
| DE | 4437360 | 4/1996 |
| DE | 19506890 | 8/1996 |
| DE | 19914257 | 1/2000 |
| DE | 10 141 695 | 3/2003 |
| EP | 0 288 068 | 7/1992 |
| EP | 05-071974 | 3/1993 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 785 535 | 7/1997 |
| EP | 0 786 646 | 7/1997 |
| EP | 0 809 117 | 11/1997 |
| EP | 0 813 072 | 12/1997 |
| EP | 0 699 330 | 4/1998 |
| EP | 0 908 835 | 4/1999 |
| EP | 0 997 808 | 5/2000 |
| EP | 1 083 764 | 3/2001 |
| EP | 1 251 362 | 10/2002 |
| EP | 1 300 652 | 4/2003 |
| EP | 1 406 617 | 3/2004 |
| EP | 1 437 573 | 7/2004 |
| EP | 1 457 928 | 9/2004 |
| EP | 1 465 041 | 10/2004 |
| EP | 1 469 287 | 10/2004 |
| EP | 1 496 338 | 1/2005 |
| EP | 1 659 817 | 5/2006 |
| EP | 1 672 474 | 6/2006 |
| EP | 1 770 956 | 4/2007 |
| EP | 1 790 947 | 5/2007 |
| EP | 1 860 904 | 11/2007 |
| EP | 1 944 701 | 7/2008 |
| EP | 1 933 249 | 8/2008 |
| EP | 1 975 567 | 10/2008 |
| FR | 2730083 | 8/1996 |
| FR | 2754093 | 4/1998 |
| FR | 2772911 | 6/1999 |
| FR | 2810183 | 12/2001 |
| GB | 2 278 196 | 11/1994 |
| GB | 2 322 248 | 8/1998 |
| GB | 2 359 888 | 9/2001 |
| GB | 2 407 230 | 4/2005 |
| JP | 62142215 | 6/1987 |
| JP | 5-191504 | 7/1993 |
| JP | 08-069436 | 3/1996 |
| JP | 8510578 | 11/1996 |
| JP | 09-054895 | 2/1997 |
| JP | 9-062993 | 3/1997 |
| JP | 9-80144 | 3/1997 |
| JP | 09-098474 | 4/1997 |
| JP | 9-113288 | 5/1997 |
| JP | 09-153125 | 6/1997 |
| JP | 09-200850 | 7/1997 |
| JP | 9-210710 | 8/1997 |
| JP | 9-319300 | 12/1997 |
| JP | 10-021259 | 1/1998 |
| JP | 10-030933 | 2/1998 |
| JP | 11-234736 | 8/1999 |
| JP | 2000-163379 | 6/2000 |
| JP | 2001-008270 | 1/2001 |
| JP | 2001-160063 | 6/2001 |
| JP | 2001-313972 | 11/2001 |
| JP | 2002-174524 | 6/2002 |
| JP | 2002-310680 | 10/2002 |
| JP | 2002-329296 | 11/2002 |
| JP | 2003-228532 | 8/2003 |
| JP | 2004-045054 | 2/2004 |
| JP | 2004-219146 | 8/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2005/277764 | 10/2005 |

(56) References Cited

FOREIGN PATENT DOCUMENTS

| | | |
|---|---|---|
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-221433 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | WO 1993/020546 | 10/1993 |
| WO | WO 1994/08250 | 4/1994 |
| WO | WO 1997/07467 | 2/1997 |
| WO | WO 1997/24577 | 7/1997 |
| WO | WO 1997/41654 | 11/1997 |
| WO | WO 1998/03951 | 1/1998 |
| WO | WO 1998/07112 | 2/1998 |
| WO | WO 1998/054682 | 12/1998 |
| WO | WO 1999/16036 | 4/1999 |
| WO | WO 1999/44183 | 9/1999 |
| WO | WO 1999/61934 | 12/1999 |
| WO | WO 2001/31966 | 5/2001 |
| WO | WO 2001/37597 | 5/2001 |
| WO | WO 2001/055994 | 8/2001 |
| WO | WO 2002/33533 | 4/2002 |
| WO | WO 2002/054813 | 7/2002 |
| WO | WO 2003/023593 | 3/2003 |
| WO | WO 2003/096055 | 11/2003 |
| WO | WO 2004/008792 | 1/2004 |
| WO | WO 2004/16032 | 2/2004 |
| WO | WO 2004/021730 | 3/2004 |
| WO | WO 2004/34194 | 4/2004 |
| WO | WO 2004/061576 | 7/2004 |
| WO | WO 2004/076977 | 9/2004 |
| WO | WO 2005/06258 | 1/2005 |
| WO | WO 2005/84052 | 9/2005 |
| WO | WO 2006/065856 | 6/2006 |
| WO | WO 2006/113125 | 10/2006 |
| WO | WO 2007/27065 | 3/2007 |
| WO | WO 2007/52285 | 5/2007 |
| WO | WO 2008/051929 | 5/2008 |
| WO | WO 2008/085740 | 7/2008 |
| WO | WO 2009/02942 | 12/2008 |

OTHER PUBLICATIONS

3rd Generation Partnership Project (3GPP); Technical Specification Group (TSG) Ran; Working Group 2 (WG2); Report on Location Services, TS RAN R2.03 V0.1.0, Apr. 1999, 43 pages.
"3rd Generation Partnership Project; Technical Specification Group Radio Access Network; Stage 2 Functional Specification of Location Services in UTRAN," 3G TS 25.305 v.3.1.0, Mar. 2000, 45 pages.
"3rd Generation Partnership Project; Technical Specification Group Services and System Aspects; Functional stage 2 description of location services in UMTS," 3G TS 23.171 v.1.1.0, Nov. 1999, 42 pages.
"Animated Transition," [online] [Retrieved on Oct. 16, 2006]; Retrieved from the Internet URL: http://designinginterfaces.com/Animated_Transition; 2 pages.
"DaimlerCrysler Guide5 Usecases Overview Map," 1 page.
Digital cellular telecommunications system (Phase 2+); Location Services (LCS); Service description, Stage 1 (GSM 02.71) ETSI, Apr. 1999, 22 pages.
"Enabling UMTS / Third Generation Services and Applications," No. 11 Report from the UMTS Forum, Oct. 2000, 72 pages.
"Error: could not find a contact with this e-mail address." Outlookbanter.com. Dec. 2006, 12 pages.
"Estonian operator to launch world's first Network-based location services," Ericsson Press Release, Oct. 11, 1999, 2 pages.
"FM 3-25.26 Map Reading and Land Navigation," Headquarters Department of the Army, Washington, DC [online] [Retrieved on Apr. 9, 2004]; Retrieved from the Internet URL: http://155.217.58.58/cgi-bin/atdl.dll/fm/3-25.26/toc.htm; Jul. 20, 2001, pp. 1-7 and J-1 to J-3.
"Frontiers in Electronic Media," *Interactions*, 1997, 4(4):32-64.
"GPS 12 Personal NavigatorTM Owner's Manual & Reference", Garmin Corporation, 1999, 66 pages.
"International Numbering and SMS—Type of Numbering, TON, Numbering Plan Indicator, NPI," *ActiveXperts SMS and Pager Toolkit 4.1*, [online] [Retrieved on Jan. 5, 2007]; Retrieved from the Internet URL: http://www.activexperts.com/support/activsms/tonnpi/; 2 pages.
"International Roaming Guide—Personal Experience(s) from Customer and Community Member," [online] [Retrieved Jun. 26, 2006]; Retrieved from the Internet URL: http://forums.cingular.com/cng/board/message?board.id=international&message.id=1185; 6 pages.
"iPhone Push Notification Server tied to Snow Leopard Server" [online], Feb. 11, 2009, Roughly Drafted Magazine. Available from: http://www.roughlydrafted.com/2009/02/11/iphone-push-notification-server-tied-to-snow-leopard-server/ [Accessed Aug. 25, 2010].
"iPhone Software/Hardware Hack: LocoGPS—GPS Add-on for the iPhone," [online] [Retrieved on Dec. 25, 2007]; Retrieved from the Internet URL: http://www.iphonehacks.com/iphone_applications/index.html; 41 pages.
"LaBarge in joint venture on bus system," Internet: URL: http://www.bizjournals.com/stlouis/stories/1998/08/10/focus2.html?t-printable, Aug. 7, 1998, 1 page.
"MobileMe pushes out new Find My IPhone, Remote Wipe service" [online], Jun. 17, 2009, AppleInsider. Available from: http://www.appleinsider.com/articles/09/06/17/mobileme_pushes_out_new_find_my_iphone_remote_wipe_service.html [Accessed Aug. 25, 2010].
"MOREnet Dialing Plan: PSTN and IP Network Integration for H.323, H.320 VoIP and Public Voice Networks," [online] [Retrieved on Jan. 11, 2008]; Retrieved from the Internet URL: http://www.more.net/technical/research/dialplan/index.html; 12 pages.
"Navizon—Peer-to-Peer Wireless Positioning," [online] [Retrieved Nov. 30, 2007]; Retrieved from the Internet URL: http://www.navizon.com/FAQ.htm; 8 pages.
"New Handsets Strut Their Stuff at Wireless '99," Internet: URL: http://findarticles.com/p/articles/mi_m0BMD/is_1999_Feb_11/ai_n27547656/ downloaded from Internet on Feb. 11, 1999, 3 pages.
"New program for mobile blogging for Pocket PC released: My Blog," [online] [Retrieved on Apr. 5, 2006]; Retrieved from the Internet URL: http://msmobiles.com/news.php/4067.html; 1 page.
"Numbering and Dialing Plan Within the United States," *Alliance for Telecommunications Industry Solutions*, 2005, 17 pages.
"Report on Location Service feature (LCS) 25.923 v1.0.0," TSG-RAN Working Group 2 (Radio layer 2 and Radio layer 3), Berlin, May 25-28, 1999, 45 pages.
"Review Guide—Google Maps for mobile (beta)," Google, 2006, 7 pages.
"Revised CR to 09/31 on work item LCS," ETSI SMG3 Plenary Meeting #6, Nice, France, Dec. 13-15, 1999. 18 pages.
"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.
"Travel Time Data Collection Handbook—Chapter 5: Its Probe Vehicle Techniques," FHWA-PL-98-035 Report, Department of Transport, University of Texas, Mar. 1998; [online] Retrieved from the Internet at http://www.fhwa.dot.gov/ohim/handbook/chap5.pdf, 70 pages.
"User-centered design of mobile solutions," NAMAHN, 2006, 18 pages.

(56) References Cited

OTHER PUBLICATIONS

"Windows Live Search for Mobile Goes Final, Still Great," [online] [Retrieved on Mar. 11, 2007]; Retrieved from the Internet URL: http://gizmodo.com/gadgets/software/windows-live-search-for-mobile-goes-final-still-great-236002.php; 3 pages.
"Windows Mobile 6 Professional Video Tour," [online] [Retrieved on Mar. 11, 2007]; Retrieved from the Internet URL: http://gizmodo.com/gadgets/cellphones/windows-mobile-6-professional-video-tour-237039.php; 4 pages.
"Windows Mobile," Microsoft, 2007, 2 pages.
Abowd et al., "Context-awareness in wearable and ubiquitous computing," *1st International Symposium on Wearable Computers*, Oct. 13-14, 1997, Cambridge, MA, 9 pages.
Abowd et al., "Cyberguide: A mobile context-aware tour guide," *Wireless Networks*, 1997, 3(5):421-433.
Akeiblom, "Tracking Mobile Phones in Urban Areas," Goteborg University Thesis, Sep. 2000, 67 pages.
Anand et al., "A Quantitative Analysis of Power Consumption for Location-Aware Applications on Smart Phones," *IEEE International Symposium on Industrial Electronics*, Jun. 4-7, 2007, pp. 1986-1991.
Ayatsuka et al., "UbiquitousLinks: Hypermedia Links Embedded in the Real World, Technical Report of Information Processing Society, 96-HI-67," Information Processing Society of Japan, Jul. 11, 1996, 96(62):23-30.
Balliet, "Transportation Information Distribution System," *IBM Technical Disclosure Bulletin*, [online] [Retrieved on Nov. 7, 2008]; Retrieved from the Internet URL: https://www.delphion.com/tdbs/tdb?order=86A+61395; Jun. 1986; 2 pages.
Balsiger et al., "MOGID: Mobile Geo-depended Information on Demand," *Workshop on Position Dependent Information Services (W3C-WAP)*, 2000, 8 pages.
Beard and Palancioglu, "Estimating Positions and Paths of Moving Objects," *IEEE*, 2000, pp. 1-8.
Bederson, "Audio Augmented Reality: A Prototype Automated Tour Guide," *CHI '95 Mosaic of Creativity*, May 7-11, 1995, Chicago, IL, pp. 210-211.
Beeharee and Steed, "Minimising Pedestrian Navigational Ambiguities Through Geoannotation and Temporal Tagging," Human-Computer Interaction, Interaction Platforms and Techniques, Springer, 2007, pp. 748-757.
Beeharee and Steed, "Natural Wayfinding—Exploiting Photos in Pedestrian Navigation Systems," *Mobile HCI*, Sep. 12, 2006, pp. 81-88.
Benefon ESC! GSM+GPS Personal Navigation Phone, benefon.com, Copyright 2001, 4 pages.
Berman and Powell, "The Role of Dead Reckoning and Inertial Sensors in Future General Aviation Navigation," *IEEE*, 1998, pp. 510-517.
Bevly and Parkinson, "Cascaded Kalman Filters for Accurate Estimation of Multiple Biases, Dead-Reckoning Navigation, and Full State Feedback Control of Ground Vehicles," *IEEE Transactions on Control Systems in Technology*, 2007, 15(2):199-208.
Binzhuo and Bin, "Mobile Phone GIS Based on Mobile SVG," *IEEE*, 2005, pp. 889-892.
Bokharouss et al., "A Location-Aware Mobile Call Handling Assistant," *21st International Conference on Advanced Information Networking and Applications Workshops*, 2007, 8 pages.
Bonsignore, "A Comparative Evaluation of the Benefits of Advanced Traveler Information System (ATIS) Operational Tests," MIT Masters Thesis, Feb. 1994, 140 pps.
Boonsrimuang et al., "Mobile Internet Navigation System," *IEEE*, 2002, pp. 325-328.
Borsodi, "Super Resolution of Discrete Arrivals in a Cellular Geolocation System," University of Calgary Thesis, Apr. 2000, 164 pages.
Brown, "The stick-e document: a framework for creating context-aware applications," *Electronic Publishing*, 1995, 8:259-272.
Brown, "Triggering Information by Context," *Personal Technologies*, 1998, 2:18-27.
Budka et al., "A Bayesian Method to Improve Mobile Geolocation Accuracy," IEEE 56th Vehicular Technology Conference Proceedings, Sep. 24-28, 2002, Vancouver, CA, 2:1021-1025.
Burnett, "Usable Vehicle Navigation Systems: Are We There Yet?" *Vehicle Electronic Systems 2000*, Jun. 29-30, 2000, 3.1.1-3.1.12.
Camp and DeHayes, Jr., "A computer-based method for predicting transit time parameters using grid systems," *Decision Sciences*, 1974, 5:339-346.
Carew, "Phones that tell you where to drive, meet, eat," [online] [Retrieved May 26, 2007]; Retrieved from the Internet URL http://news.yahoo.com/s/nm/20070525/wr_nm/column_pluggedindc_2 &printer=1;_ylt=Ahqaftn7xm1S2r0FZFeu9G4ht.cA; 2 pages.
Challe, "CARMINAT—An Integrated information and guidance system," *Vehicle Navigation and Information Systems Conference*, Oct. 20-23, 1991, Renault—Direction de la Recherche, Rueil-Malmaison, France.
Change Request for "U.S. specific Emergency Services requirements included as an informative annex," Nov. 29, 1999, 2 pages.
Charny, "AT&T puts 411 to the text," [online] [Retrieved Mar. 4, 2009]; Retrieved from the Internet URL http://news.cnet.com/ATT-puts-411-to-the-text/2100-1039_3-1000669.html; May 8, 2003; 2 pages.
Cheverst et al., "Architectural Ideas for the Support of Adaptive Context-Aware Applications," *Proceedings of Workshop on Infrastructure for Smart Devices—How to Make Ubiquity an Actuality, HUC'00*, Bristol, Sep. 2000, 3 pages.
Cheverst et al., "Design of an Object Model for a Context Sensitive Tourist Guide," *Computers and Graphics*, 1999, 23(6):883-891.
Cheverst et al., "Developing Interfaces for Collaborative Mobile Systems," 1999, 15 pages.
Cheverst et al., "Experiences of Developing and Deploying a Context-Aware Tourist Guide: The GUIDE Project," 2000, pp. 20-31.
Cheverst et al., "Exploiting Context to Support Social Awareness and Social Navigation," *SIGGROUP Bulleting* Dec. 2000, 21(3):43-48.
Cheverst et al., "Services to Support Consistency in Mobile Collaborative Applications," *Proc. 3rd International Workshop on Services in Distributed Networked Environments*, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," *Workshop on Handheld CSCW*, 1998, 6 pages.
Cheverst et al., "The Role of Connectivity in Supporting Context-Sensitive Applications," *HUC'99, LNCS 1707*, 1999, pp. 193-209.
Cheverst et al., "The Support of Mobile-Awareness in Collaborative Groupware," *Personal Technologies*, 1999, 3:33-42.
Cho et al., "A Traveler Information Service Structure in Hybrid T-DMB and Cellular Communication Network," *IEEE*, 2006, pp. 747-750.
Christie et al., "Development and Deployment of GPS wireless devices for E911 and Location based services," Position, location and Navigation Symposium, Palm Springs, CA, Apr. 15-18, 2002, pp. 60-65w.
Chua et al., "Intelligent Portal for Event-triggered SMS Alerts," *2nd International Conference on Mobile Technology, Applications and Systems*, 2005, 7 pages.
Civilis et al., "Efficient Tracking of Moving Objects with Precision Guarantees," *Proc. First Annual International Conference on Mobile and Ubiquitous Systems: Networking and Services (MobiQuitous '04)*, 2004, 10 pages.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
Costa et al., "Experiments with Reflective Middleware," *Proceedings of the ECOOP '98 Workshop on Reflective Object-Oriented Programming and Systems, ECOOP '98 Workshop Reader*, 1998, 13 pages.

(56) References Cited

OTHER PUBLICATIONS

Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJlb954T_DQn6gB; 1 page.
Davies et al., "'Caches in the Air': Disseminating Tourist Information in the Guide System," *Second IEEE Workshop on Mobile Computer Systems and Applications*, Feb. 25-26, 1999, 9 pages.
Davies et al., "L2imbo: A distributed systems plastform for mobile computing," *Mobile Networks and Applications*, 1998, 3:143-156.
Dey et al., "CyberDesk: a framework for providing self-integrating context-aware services," *Knowledge-Based Systems*, 1998, 11:3-13.
Dey, "Context-Aware Computing: The CyberDesk Project," [online] Retrieved from the Internet: URL: http://www.cc.gatech.edu/fce/cyberdesk/pubs/AAAI98/AAAI98.html; *AAAI '98 Spring Symposium*,. Stanford University, Mar. 23-25, 1998, downloaded from the Internet on Aug. 6, 2010, 8 pages.
Dibdin, "Where are mobile location based services?" *CM316 Multimedia Systems Paper*, Dec. 14, 2001, 8 pages.
Dix et al., "Exploiting Space and Location as a Design Framework for Interactive Mobile Systems," *ACM Transactions on Computer-Human Interaction (TOCHI)—Special issue on human-computer interaction with mobile systems*, 2000, 7(3):285-321.
Dommety and Jain, "Potential Networking Applications of Global Positioning Systems (GPS)," [online] [Retrieved on Nov. 18, 2008]; Retrieved from the Internet URL: http://arxiv.org/ftp/cs/papers/9809/9809079.pdf; OSU Technical Report TR-24, Apr. 1996, 41 pages.
Drane and Rizos, "Role of Positioning Systems in ITS," *Positioning Systems in Intelligent Transportation Systems*, Dec. 1997, pp. 312, 346-349.
Drane et al., "Positioning GSM Telephones," *IEEE Communications Magazine*, Apr. 1998, pp. 46-59.
Drane et al., "The Accurate Location of Mobile Telephones," *Third Annual World Congress on Intelligent Transport Systems*, Orlando, Florida, Oct. 1996, 8 pages.
Dunn and Toohey, "Wireless Emergency Call System," *IBM Technical Disclosure Bulletin*, Sep. 1994; 1 page.
Ebine, "Dual frequency resonant base station antennas for PDC systems in Japan," *IEEE*, 1999, pp. 564-567.
Efstratiou and Cheverst, "Reflection: a Solution for Highly Adaptive Mobile Systems," *2000 Workshop on Reflective Middleware*, 2000, 2 pages.
Efstratiou et al., "Architectural Requirements for the Effective Support of Adaptive Mobile Applications," 2000, 12 pages.
Evans et al., "In-Vehicle Man-Machine Interaction. The Socrates Approach," *Vehicle Navigation & Information System Conference Proceedings*, 1994, Aug. 31-Sep. 2, 1994, pp. 473-477.
European Search Report in EP 12 15 4024 dated Apr. 10, 2012, 6 pages.
European Search Report in EP 12 15 4025 dated Apr. 12, 2012, 7 pages.
European Search Report in EP 12 15 4026 dated Apr. 10, 2012, 5 pages.
European Search Report in EP 12 15 4027 dated Apr. 10, 2012, 7 pages.
Feddema et al., "Cooperative Sentry Vehicles and Differential GPS Leapfrog," 2000, *United States Department of Energy*, pp. 1-12.
Fischer et al., "System Performance Evaluation of Mobile Positioning Methods," *IEEE*, Aug. 2002, pp. 1962-1966.
Flinn and Satyanarayanan, "PowerScope: a Tool for Profiling the Energy Usage of Mobile Applications," *Proc. WMCSA '99 Second IEEE Workshop on Mobile Computing Systems and Applications*, Feb. 25-26, 1999, 9 pages.
French and Driscoll, "Location Technologies for Its Emergency Notification and E911," *Proc. 1996 National Technical Meeting of the Institute of Navigation*, Jan. 22-24, 1996, pp. 355-359.
Freundschuh, "Does 'Anybody' Really Want (or Need) Vehicle Navigation Aids?" *First Vehicle Navigation and Information System Conference*, Sep. 11-13, 1989, Toronto, Canada, 5 pages.
Friday et al., "Developing Adaptive Applications: The MOST Experience," *J. Integrated Computer-Aided Engineering*, 1999, pp. 143-157.
Gould, "The Provision of Usable Navigation Assistance: Considering Individual Cognitive Ability," *First Vehicle Navigation and Information System Conference*, Sep. 11-13, 1989, Toronto, Canada, 7 pages.
Green et al., "Suggested Human Factors Design Guidelines for Driver Information Systems," *Technical Report UMTRI-93-21*, Nov. 1993, 119 pages.
Gunnarsson et al., "Location Trial System for Mobile Phones," *IEEE*, 1998, pp. 2211-2216.
Guo et al., "An Intelligent Query System Based on Chinese Short Message Service for Restaurant Recommendation," *Sixth International Conference on the Management of Mobile Business (ICMB 2007)*, 2007, 1 page.
Hameed and Shabnam, "An Intelligent Agent-Based Medication and Emergency System," *IEEE*, 2006, pp. 3326-3330.
Helal et al., "Drishti: An Integrated Navigation System for Visually Impaired and Disabled," *Fifth International Symposium on Wearable Computers (ISWC'01)*, 2001, pp. 149-156.
Hodes and Katz, "Composable ad hoc location-based services for heterogeneous mobile clients," *Wireless Networks*, 1999, 5:411-427.
Hohman et al., "GPS Roadside Integrated Precision Positioning System," *Position Location and Navigation Symposium*, 2000, pp. 221-230.
Hoogenraad, "Location Dependent Services," *3rd AGILE Conference on Geographic Information Science*, Helsinki/Espoo, Finland, May 25-27, 2000, pp. 74-77.
Jirawimut et al., "A Method for Dead Reckoning Parameter Correction in Pedestrian Navigation System," *IEEE Transactions on Instrumentation and Measurement*, 2003, 52(1):209-215.
Jose and Davies, "Scalabe and Flexible Location-Based Services for Ubiquitous Information Access," *HUC'99, LNCS 1707*, 1999, pp. 52-66.
Ju et al., "RFID Data Collection and Integration Based on Mobile Agent," *IEEE*, 2006, 4 pages.
Kbar and Mansoor, "Mobile Station Location based on Hybrid of Signal Strength and Time of Arrival," *Proc. International Conference on Mobile Business (ICMB'05)*, 2005, 7 pages.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Klinec and Nolz, "Nexus-Positioning and Communication Environment for Spatially Aware Applications," *IAPRS*, Amsterdam, 2000, 7 pages.
Koide and Kato, "3-D Human Navigation System with Consideration of Neighboring Space Information," *2006 IEEE International Conference on Systems, Man and Cybernetics*, Oct. 8-11, 2006, Taipei, Taiwan, pp. 1693-1698.
Kovacs et al., "Adaptive Mobile Access to Context-aware Services," *Proc. ASAMA '99 Proc. First International Symposium on Agent Systems and Applications Third International Symposium on Mobile Agents*, IEEE Computer Society Washington, DC, 1999, 12 pages.
Kreller et al., "A Mobile-Aware City Guide Application," *ACTS Mobile Communication Summit*, 1998, Rhodes, Greece, 7 pages.
Kreller et al., "UMTS: A Middleware Architecture and Mobile API/Approach," *IEEE Personal Communications*, Apr. 1998, pp. 32-38.
Kugler and Lechner, "Combined Use of GPS and LORAN-C in Integrated Navigation Systems," *Fifth International Conference on Satellite Systems for Mobile Communications and Navigation*, London, UK, May 13-15, 1996, pp. 199-207.
Kyriazakos et al., "Optimization of the Handover Algorithm based on the Position of the Mobile Terminals," *Communications and Vehicular Technology*, Oct. 2000, pp. 155-159.
Leonhardt and Magee, "Multi-Sensor Location Tracking," *MOBICOM 98*, Dallas, TX, pp. 203-214.

(56) References Cited

OTHER PUBLICATIONS

Leonhardt and Magee, "Towards a general location service for mobile environments," *Proc. Third International Workshop on Services in Distributed and Networked Environments*, Jun. 3-4, 1996, 8 pages.
Lloyd and Tianlin, "Cellular phone base stations installation violate the Electromagnetic Compatibility regulations," *2004 4th International Conference on Microwave and Millimeter Wave Technology Proceedings*, 2004, pp. 920-922.
Long et al., "Rapid Prototyping of Mobile Context-Aware Applications: The Cyberguide Case Study," *MobiCom '96*, 1996, 11 pages.
Lusky et al., "Mapping the Present," *ColoradoBiz*, Nov. 1999, 26(11):16-17.
Maaβ, "Location-Aware Mobile Applications based on Directory Services," *MOBICOM 97*, 1997, Budapest, Hungary, pp. 23-33.
Mahmassani et al., "Providing Advanced and Real-Time Travel/Traffic Information to Tourists," *Center for Transportation Research, Bureau of Engineering Research, The University of Texas at Austin*, Oct. 1998, 15 pages.
Manabe et al., "On the M-CubITS Pedestrian Navigation System," *Proc. IEEE Intelligent Transportation Systems Conference*, Toronto, Canada, Sep. 17-20, 2006, pp. 793-798.
Mark, "A Conceptual Model for Vehicle Navigation Systems," *First Vehicle Navigation and Information System Conference*, Sep. 11-13, 1989, Toronto, Canada 11 pages.
Maxwell et al., "Alfred: The Robot Waiter Who Remembers You," *AAAI Technical Report* WS-99-15, 1999, 12 pages.
McCarthy and Meidel, "ACTIVEMAP: A Visualization Tool for Location Awareness to Support Informal Interactions," *HUC '99, LNCS 1707*, 1999, pp. 158-170.
Meier and Cahill, "Location-Aware Event-Based Middleware: A Paradigm for Collaborative Mobile Applications?" *8th CaberNet Radicals Workshop*, 2003, 5 pages.
Microsoft Outlook 2003 User's Guide, http://opan.admin.ufl.edu/user_guides/outlook2003.htm. Aug. 2004, 17 pages.
Miller et al., "Integrating Hierarchical Navigation and Querying: A User Customizable Solution," *ACM Multimedia Workshop on Effective Abstractions in Multimedia Layout, Presentation, and Interaction*, San Francisco, CA, Nov. 1995, 8 pages.
Miller et al., "Synchronization of Mobile XML Databases by Utilizing Deferred Views," *IEEE*, 2004, pp. 186-191.
Mio Technology "User's Manual MioMap 2.0," Mio DigiWalker, 2005, 59 pages.
Mio Technology: "27 Countries in your pocket," [online] [Retrieved on Jul. 9, 2008]; Retrieved from the Internet URL: http://www.mio-tech.be/en/printview/press-releases-2005-09-29.htm; 1 page.
Mio Technology: "Mio 269+ User's Manual," [online] [Retrieved on Jul. 9, 2008]; Retrieved from the Internet URL: http://www.mio-tech.be/Manuals/269+/Device-Manual/268-plus-269-plus-Device-Manual-EN.pdf> Mio DigiWalker, Aug. 2005, 44 pages.
Muraskin, "Two-Minute Warnings for School Bus Riders," Internet: URL: http://www.callcentermagazine.com/shared/printableArticle.jhtml;jsessionid=PQH1SZXW . . . Jul. 1, 1999, 3 pages.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Nardi et al., "Integrating Communication and Information Through Contact Map," *Communications of the ACM*, 2002, 45(4):89-95.
Ni and Deakin, "On-Board Advanced Traveler Information Systems," Dec. 1, 2002, 10 pages.
Noonan and Shearer, "Intelligent Transportation Systems Field Operational Test Cross-Cutting Study Advance Traveler Information systems," *Intelligent Transportation Systems Field Operational Test Cross-Cutting Study*, Sep. 1998, 26 pages.
Northard, "Docking Station Communication Link," *IBM Technical Disclosure Bulletin*, 1994, 4 pages.
O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.
Oh et al., "Spatial Applications Using 4S Technology for Mobile Environment," *IEEE*, 2002, 3 pages.
Paksoy et al., "The Global Position System—Navigation Tool of the Future," *J. Electrical & Electronics*, 2002, 2(1):467-476.
Parikh, "Tele Locate," *IBM Technical Disclosure Bulletin*, [online] [Retrieved on Nov. 7, 2008]; Retrieved from the Internet URL: https://www.delphion.com/tdbs/tdb?order=92A+62775; 1992, 1 page.
Pascoe et al., "Developing Personal Technology for the Field," *Personal Technologies*, 1998, 2:28-36.
Pfoser et al., "Dynamic Travel Time Maps—Enabling Efficient Navigation," *Proc. 18th International Conference on Scientific and Statistical Database Management (SSDBM'06)*, 2006, 10 pages.
Popescu-Zeletin et al., "Applying Location-Aware Computing for Electronic Commerce: Mobile Guide," *Proc. 5th Conference on Computer Communications*, AFRICOM-CCDC'98, Oct. 20-22, 1998, 14 pages.
Portfolio 2007; [online] [Retrieved on Jun. 14, 2007]; Retrieved from the Internet URL: http://eric.wahlforss.com/folio; 3 pages.
Pungel, "Traffic control—beat the jam electronically," *Funkschau*, 1988, 18:43-45 (w/English translation).
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto et al., "Augment-able Reality: Situated Communication through Physical and Digital Spaces," *Second International Symposium on Wearable Computers (ISWC'98)*, 1998, pp. 1-8.
Rillings and Betsold, "Advanced driver information systems," *Vehicular Technology*, IEEE Vehicular Technology Society, 1991, 40:31-40.
Rogers et al., "Adaptive User Interfaces for Automotive Environments," *Proc. IEEE Intelligent Vehicles Symposium 2000*, Oct. 3-5, 2000, Dearborn, MI, pp. 662-667.
Rozier et al. "Hear&There: An Augmented Reality System of Linked Audio," *Proceedings of the International Conference on Auditory Display*, Atlanta, GA, Apr. 2000, pp. 1-5.
Samadani et al., "PathMarker: systems for capturing trips," *2004 IEEE International Conference on Multimedia and Expo (ICME)*, Jun. 27-30, 2004, 3:2123-2126.
Schreiner, "Where We at? Mobile Phones Bring GPS to the Masses," *IEEE Computer Society*, May/Jun. 2007, pp. 6-11.
Serafin et al., "Functions and Features of Future Driver Information Systems," *Technical Report UMTRI-91-16*, May 1991, 104 pages.
Shekhar and Liu, "Genesis and Advanced Traveler Information Systems (ATIS): Killer Applications for Mobile Computing?" *NSF Mobidata Workshop on Mobile and Wireless Information Systems*, Nov. 1994, 20 pages.
Shibata et al., "Development and Integration of Generic Components for a Teachable Vision-Based Mobile Robot," *IEEE/ASME Transactions on Mechatronics*, 1996, 1(3):230-236.
Spohrer, "New Paradigms for Using Computers (Abstract)," 1997; [online]; Retrieved from the Internet URL: http://www.almaden.ibm.com/almaden/npuc97/1997/spohrer.htm; 1 page.
Sung et al., "Towards Reliable Peer-to-Peer Data Sharing over Mobile Ad hoc Networks," *IEEE*, 2005, 5 pages.
Tarumi et al., "Public Applications of SpaceTag and Their Impacts," *Digital Cities, LNCS 1765*, 2000, pp. 350-363.
Tebbutt, "Dial your way out of the woods," *The Australian*, Feb. 2000, 1 page.
Tijerina et al., "Driver Workload Assessment of Route Guidance System Destination Entry While Driving: A Test Track Study," *Proceedings of the 5th ITS World Congress*, Oct. 12-16, 1998, Seoul, Korea, 9 pages.
Tso et al., "Always on, Always Connected Mobile Computing," *Mobile Communications Operation—Mobile Handheld Products Group*, 1996, pp. 918-924.

(56) References Cited

OTHER PUBLICATIONS

Tsuzawa and Okamoto, "Advanced Mobile Traffic Information and Communication System," *First Vehicle Navigation and Information Systems Conference*, Sep. 11-13, 1989, Toronto, Canada, Abstract only.

Wang and Huang, "An Unified Vehicle Supervising and Traffic Information System," *IEEE*, 1996, pp. 968-972.

Wang and Lin, "Location Aware Information Agent over WAP," *Tamkang Journal of Science and Engineering*, 2000, 3(2):107-115.

Weinberg, "Using the ADXL202 in Pedometer and Personal Navigation Applications," AN-602, Analog Devices, Jul. 2002, 8 pages.

Weiβ et al., "Zone Services—An Approach for Location-based Data Collection," *Proceedings of the 8th IEEE International Conference on E-Commerce Technology and the 3rd IEEE International Conference on Enterprise Computing, E-Commerce and E-Services (CEC/EEE'06)*, 2006, 8 pages.

Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pps.

Wong, "GPS: making roads safer and solving traffic tangles," *Asia Engineer*, 1995, 23(9):31-32.

Wu et al., "A Multimedia System for Route Sharing and Video-Based Navigation," *IEEE*, 2006, pp. 73-76.

Yamamoto et al., "Position Location Technologies Using Signal Strength in Cellular Systems," *IEEE 53rd Vehicular Technology Conference*, May 6-9, 2001, Rhodes, Greece, 53:2570-2574.

Yang and Marsland, "Global Snapshots for Distributed Debugging," *IEEE*, 1992, pp. 436-440.

Yanyan et al., "The Model of Optimum Route Selection in Vehicle Automatic Navigation System Based on Unblocked Reliability Analyses," *IEEE*, 2003, pp. 975-978.

Ygnace et al., "Travel Time Estimation on the San Francisco Bay Area Network Using Cellular Phones as Probes," Working Paper, Institute of Transportation Studies, University of California, Berkeley, 2000, 58 pages.

Yim et al., "Travinfo Field Operational Test: Work Plan for the Target, Network, and Value Added Reseller (VAR) Customer Studies," *Working Papers, California Partners for Advanced Transit and Highways (PATH), Institute of Transportation Studies, UC Berkeley*, Apr. 1, 1997, 49 pages.

Yogesh C. Rathod, Third Party Submission in U.S. Appl. No. 12/233,358 mailed Mar. 30, 2010, 12 pages.

Yokote, "The Apertos Reflective Operating System: The Concept and Its Implementation," *OOPSLA'92*, pp. 414-434.

Zhao, "Mobile Phone Location Determination and Its Impact on Intelligent Transportation Systems," *IEEE Transactions on Intelligent Transportation Systems*, Mar. 2000, 1(1):55-64.

Spring, Tom. "Wireless Palm VII Ships." CNN, Cable News Network, May 24, 1999, http://www.cnn.com/TECH/computing/9905/24/palm7.idg/, 3pp.

\* cited by examiner

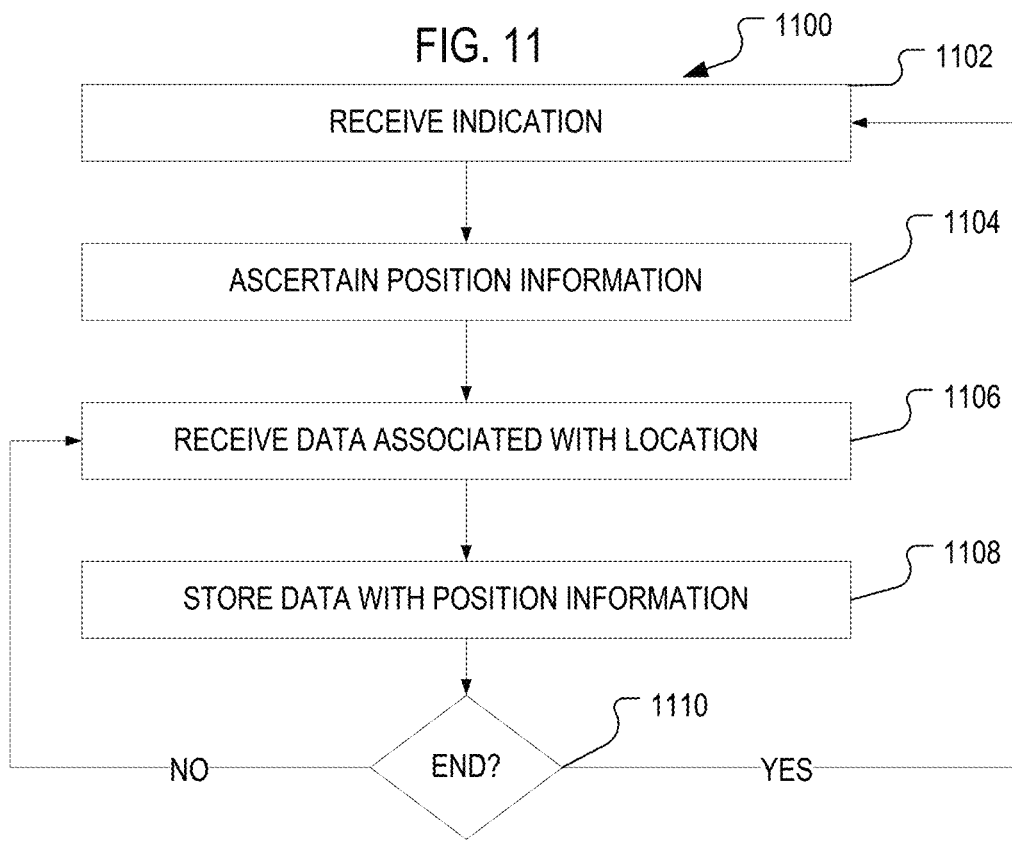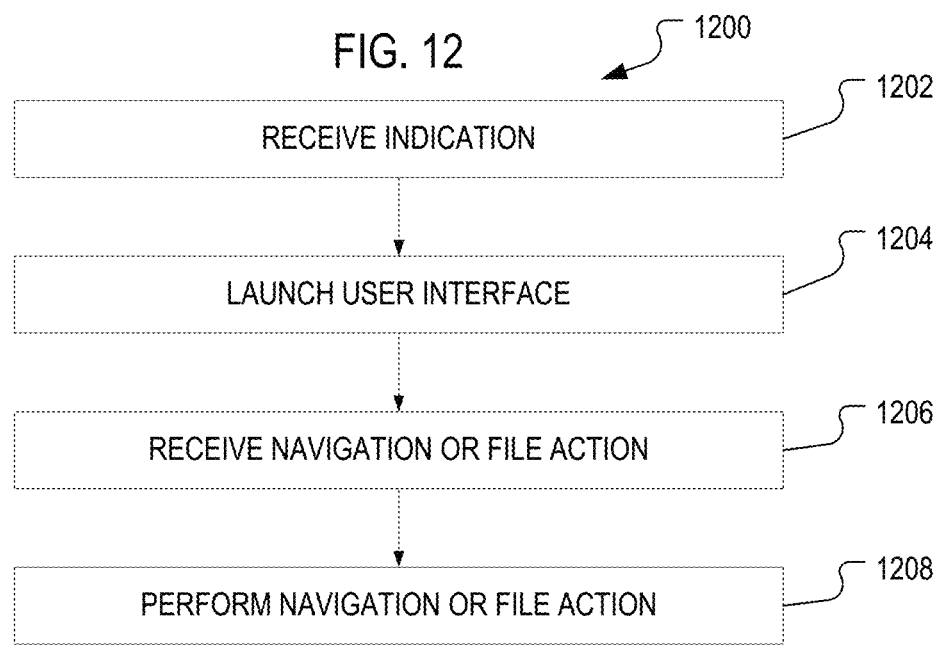

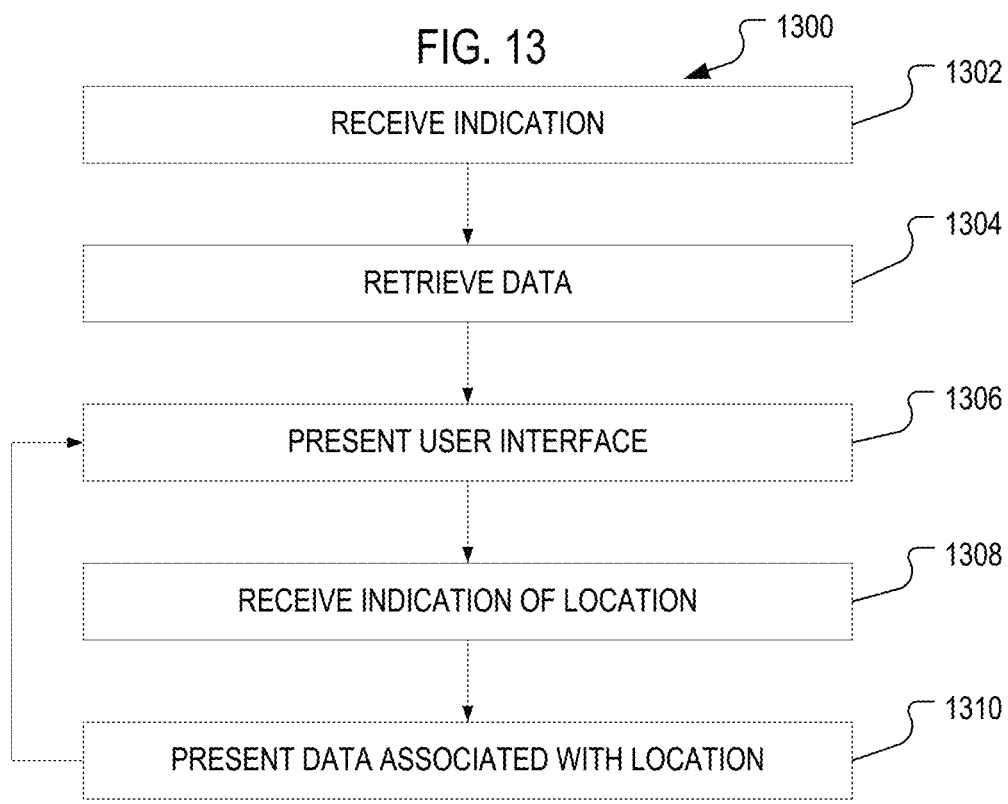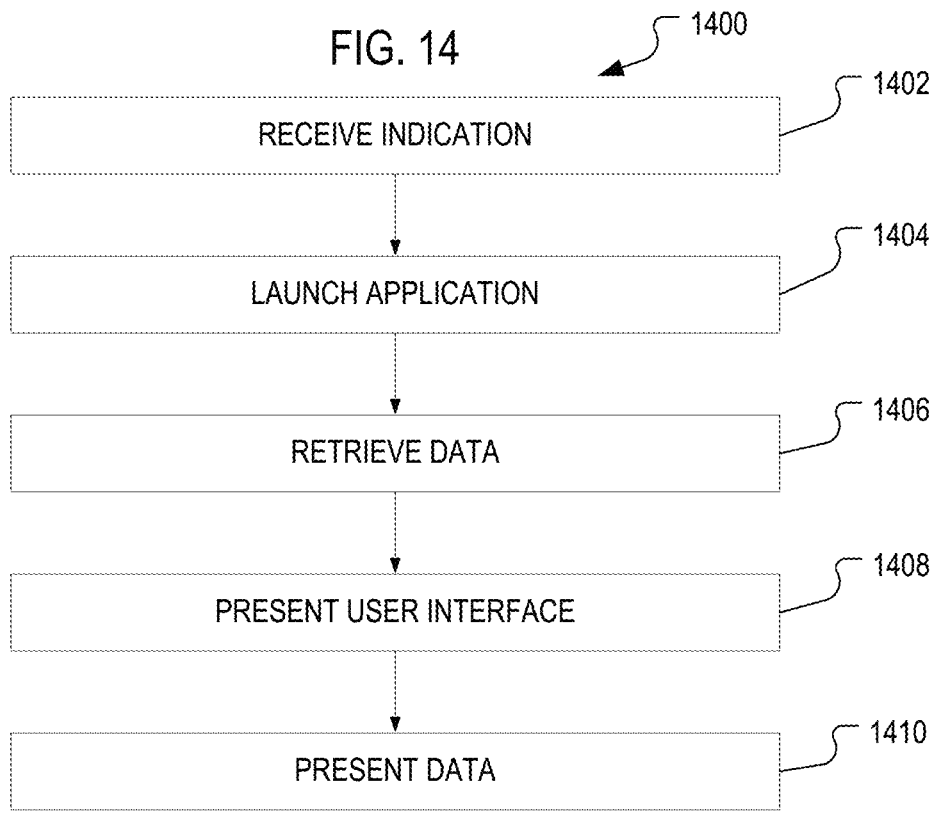

LOCATION BASED TRACKING

CROSS-REFERENCE TO RELATED APPLICATIONS

This application is a continuation of U.S. patent application Ser. No. 15/070,613, filed on Mar. 15, 2016, and entitled "LOCATION BASED TRACKING", now U.S. Pat. No. 9,891,055, which is a continuation of U.S. patent application Ser. No. 14/584,747, filed Dec. 29, 2014, and entitled "LOCATION BASED TRACKING," now U.S. Pat. No. 9,310,206, which is a continuation of U.S. patent application Ser. No. 13/361,897, filed Jan. 30, 2012, and entitled "LOCATION BASED TRACKING," now U.S. Pat. No. 8,924,144, which is a continuation of U.S. patent application Ser. No. 12/164,866, filed Jun. 30, 2008, and entitled "LOCATION BASED TRACKING," now U.S. Pat. No. 8,108,144, which claims priority to U.S. Provisional Patent Application Ser. No. 60/946,813 filed Jun. 28, 2007, and entitled "LOCATION BASED TRACKING," the contents of each of which are incorporated herein by reference.

TECHNICAL FIELD

The subject matter of this patent application is generally related to location based services.

BACKGROUND

Mobile devices have grown more powerful and feature-rich and now include such features as personal digital assistant (PDA) capabilities, cameras to capture video and still images, Internet access, etc. Location-based services have been developed for determining and tracking the locations of the users of mobile devices. Location-based services provide location-specific information to mobile devices, including, for example, global positioning system (GPS) data to locate the mobile device on a map of a geographic region.

A number of applications are available for aiding users in navigation and route planning. Some of these applications use mobile devices containing global positioning systems to define the location of the mobile device and plan a route to a desired destination. Currently, however, these route planning systems do not provide a way to document items of interest to a user while a route is traveled. In conventional systems, the information the route planning systems provide is limited to what is pre-programmed. This information can become obsolete in time and may be of little or no interest to the user.

SUMMARY

Location information is used to build a database of locations having associated audio, video, image or text data.

In some implementations, a method includes: presenting a map of a geographic region on a touch-sensitive display; receiving touch input selecting a geographic location; determining geographic positioning information of the geographic location; receiving data in response to an input received by a touch-sensitive display; associating the data with the geographic positioning information of the geographic location to produce geographically tagged data; and storing the geographically-tagged data.

In some implementations a method includes: presenting indications of a predetermined group of geographic locations on a touch-sensitive display; receiving a selection of a geographic location from the group of geographic locations displayed on the touch-sensitive display; and presenting geographically tagged data associated with the geographic location in a user interface on the touch-sensitive display.

In some implementations, a user interface includes a touch-sensitive display area for displaying indications of a predetermined group of geographic locations associated by an attribute, wherein each indication represents geographically coded data associated with a geographic position, and wherein a name of the attribute is displayed in the user interface.

Other implementations are disclosed, including implementations directed to systems, methods, apparatuses, computer-readable mediums and user interfaces.

DESCRIPTION OF DRAWINGS

FIG. 11 is a flow diagram of an example process for indicating geographic locations of interest.

FIG. 12 is a flow diagram of an example process for reviewing and editing data associated with geographic locations of interest.

FIG. 13 is a flow diagram of an example process for interactively displaying data associated with geographic locations of interest.

FIG. 14 is a flow diagram of an example process for playback of data associated with geographic locations of interest.

DETAILED DESCRIPTION

Figure 1:
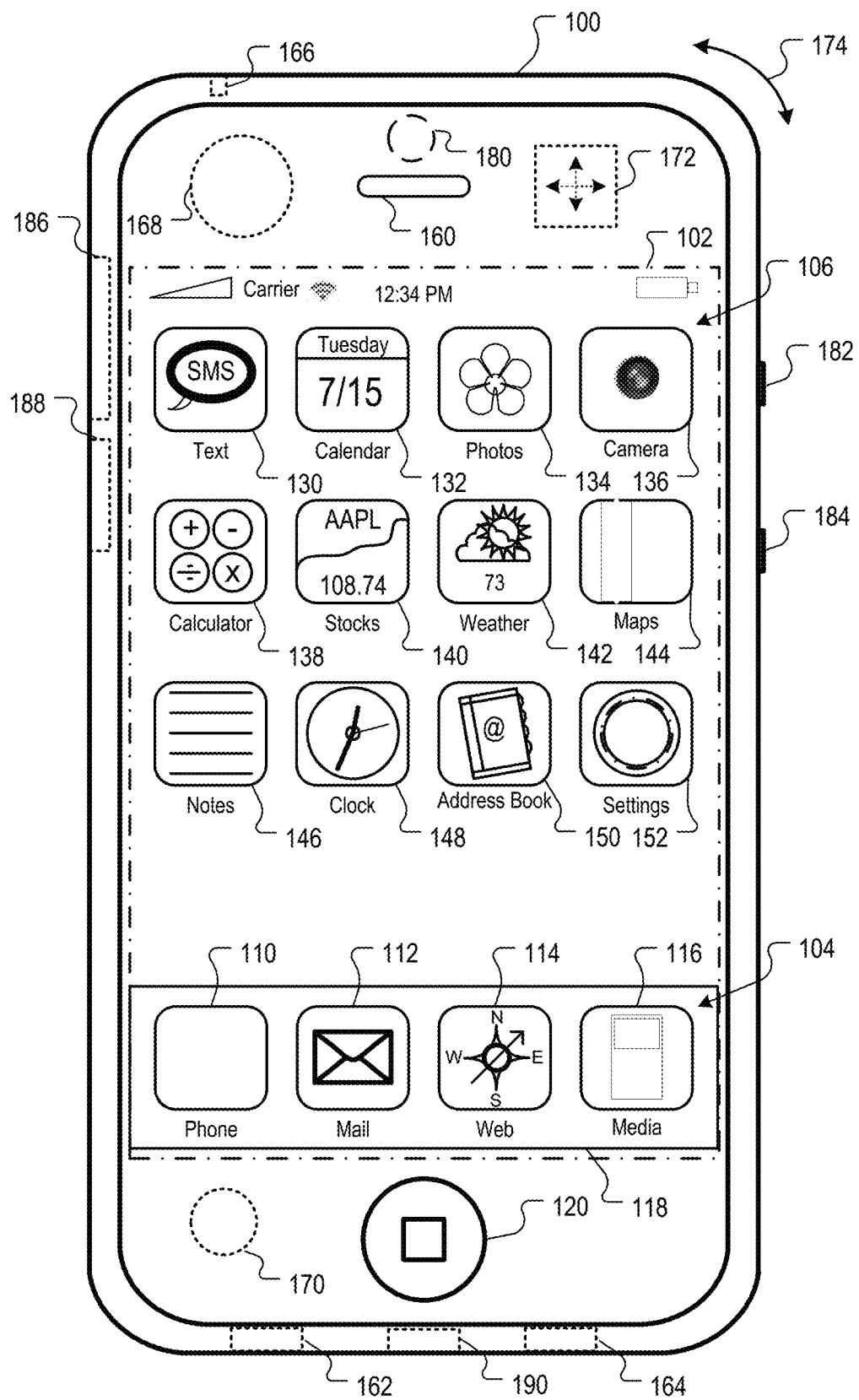
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device, a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323, 846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Exemplary Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
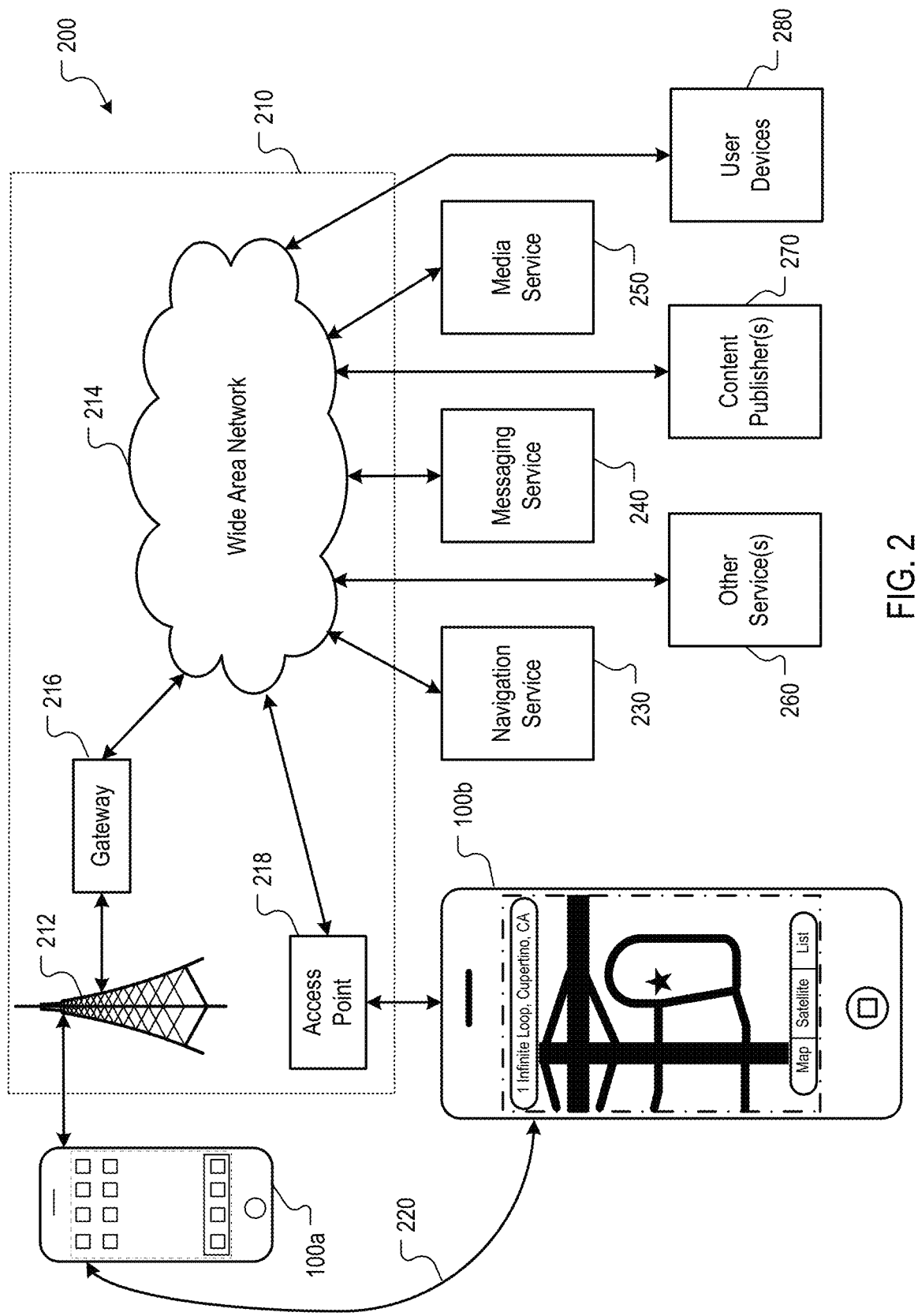
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100*a* can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100*b* can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100*a* and 100*b* can also establish communications by other means. For example, the wireless device 100*a* can communicate with other wireless devices, e.g., other wireless devices 100, cell phones, etc., over the wireless network 212. Likewise, the mobile devices 100*a* and 100*b* can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100*b* has invoked a map functionality, e.g., by pressing the maps object 144 on the top-level graphical user interface shown in FIG. 1, and has requested and received a map for the location "1 Infinite Loop, Cupertino, Calif."

User devices 280 can, for example, communicate with the one or more services 230, 240, 250 and 260 and/or one or more content publishes 260 over the one or more wired and/or wireless networks 210 to access content and services as well as communicate with the mobile device 100. The user devices 280 can be, for example, a personal computer, a set top, a gaming device, a digital video recorder, a portable audio or video player, an in-vehicle navigation system, etc.

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers, e.g., content publisher(s) 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Exemplary Mobile Device Architecture

Figure 3:
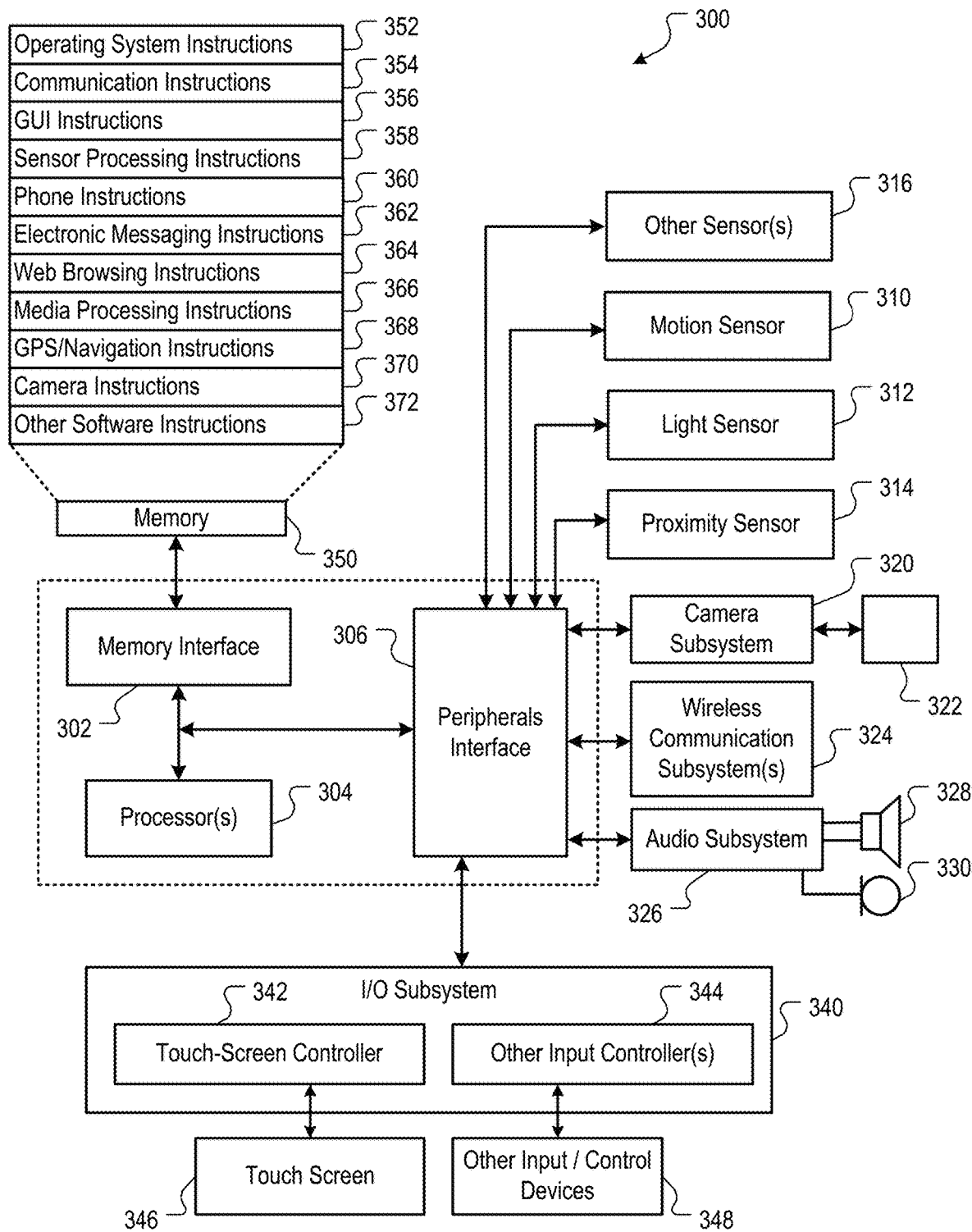
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Figure 4:
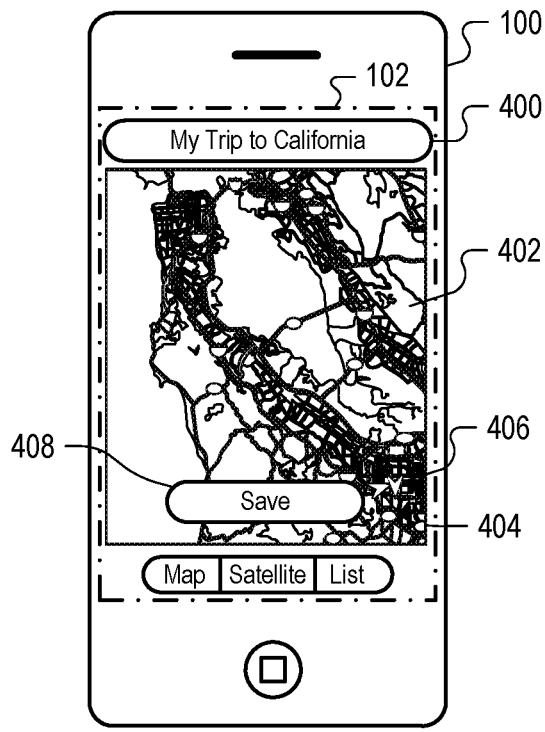
FIGS. 4-10 are exemplary interfaces to input, review and display data associated with geographic locations of interest.

FIG. 4 is an example user interface that is presented on the mobile device 100 in response to a user selection of, e.g., the maps object 144. The user interface includes an information display area 400 and a map display area 402. A position of the mobile device is indicated by an indicator 404. The information display area 400 receives user input from the touch-sensitive display 102. In some implementations, upon an input of a location, e.g., California, the user is presented with an object 408 providing an option to save data associated with the input location.

In some implementations, the user provides a "friendly name" to identify the location or group of locations of interest. If, for example, a user would like to save data related to a trip to California, the user can identify the data by entering, e.g., "My Trip to California" into the display area 400. A user can save the data in accordance with any attribute.

In some implementations, an indicator 406 can be placed on the map display area 402 to indicate a particular geographic location of interest. For example, if the location if interest is in Cupertino, user input can be received from the touch sensitive display 102 to place the indicator 406 on the map display area 402 at either the current location of the mobile device 100 (shown as reference numeral 404) or a user-specified location.

Where the current location of the mobile device 100 is used to specify the geographic location of interest, according to some implementations, geographic position information can be provided to the mobile device 100 from, for example, Global Positioning System (GPS) coordinate data. The GPS coordinate data can be processed by the GPS/Navigation instructions 368 and can be provided from an external or internal GPS navigation system. Triangulation and external GPS information can be provided to the mobile device 100 through the wireless communication subsystems 324 or port device 190.

In some implementations, the geographic information regarding the geographic location of interest is manually input by the user. The user can input a street address, a latitude/longitude pair, or other identifying geographic information to specify the geographic location of interest.

Figure 5:
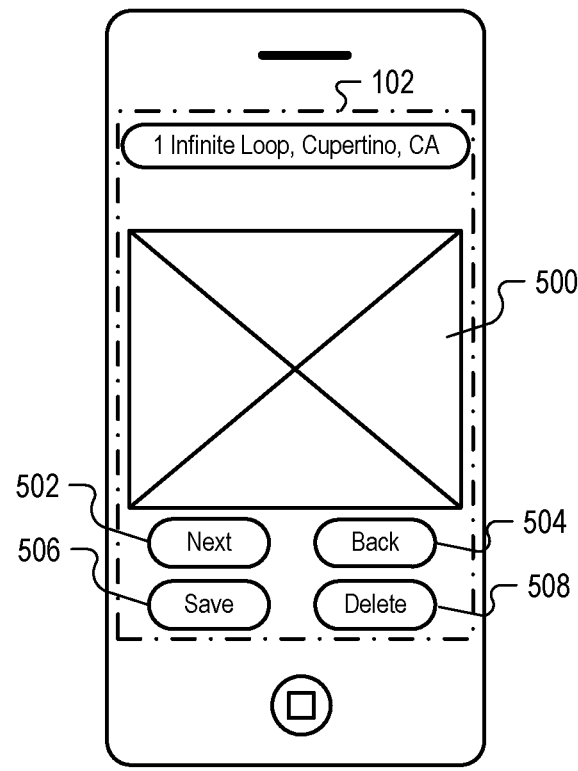

After a geographic location of interest has been indicated, in some implementations, an example user interface 500 shown in FIG. 5 is presented on the mobile device 100 in response to invoking the camera object 136. A next object 502 and back object 504, are provided to navigate within the user interface 500. A save object 506 and delete object 508 are provided to operate on pictures captured by the mobile device 100. In some implementations, audio data is captured as the picture data is captured by the mobile device 100.

In some implementations, pictures captured by the mobile device are geographically associated with the geographic location of interest when the save object 506 is selected to save the currently displayed picture. In some implementations, the geographic association is automatically performed using the determined position of the mobile device. In some implementations, the geographic association is manually input by a user when touching the save object 506 on the touch-sensitive display 102.

In some implementations, the association of geographic information with data is performed by geo-tagging the data. For example, geographic position information (e.g., latitude and longitude), geographic place names, or geographical regions are associated with the data. In the example of FIG. 5, the geographic information could be, for example, latitude 37.331837, longitude –122.030799; or 1 Infinite Loop, Cupertino, Calif., USA. In some implementations, the geographic information can be included as meta tags in a document.

In some implementations, the user interface 500 can be used to capture video when the camera object 136 is invoked by a user. The video data is saved on the mobile device 100 with associated geographic information as described above with regard to pictures data.

Figure 6:
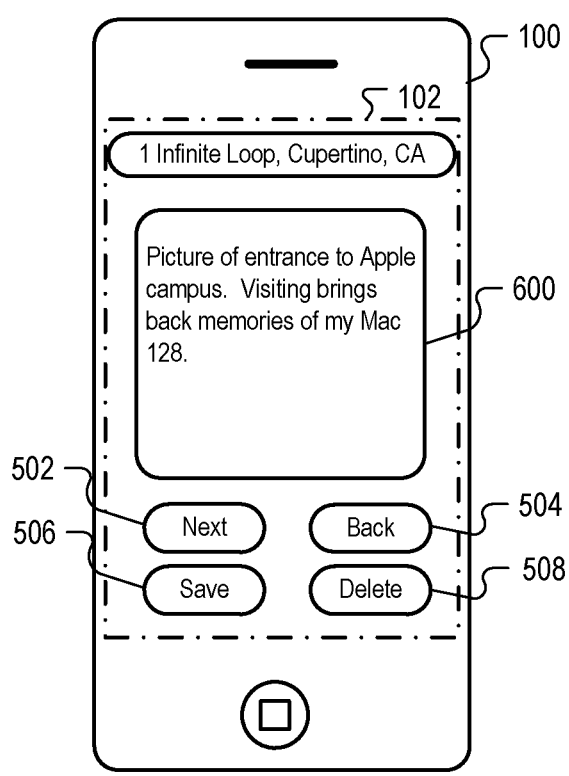

Referring to FIG. 6, notes (e.g., text information or audio information) about the geographic location of interest can be recorded using the notes object 146. The next object 502 and back object 504, are provided to navigate within the user interface 600. The save object 506 and delete object 508 are provided to operate on the notes entered on the mobile device 100. In the manner described above, notes received by the mobile device 100 are geographically associated with the geographic location of interest when the save object 506 is selected to save the current notes on the mobile device 100.

Figure 7:
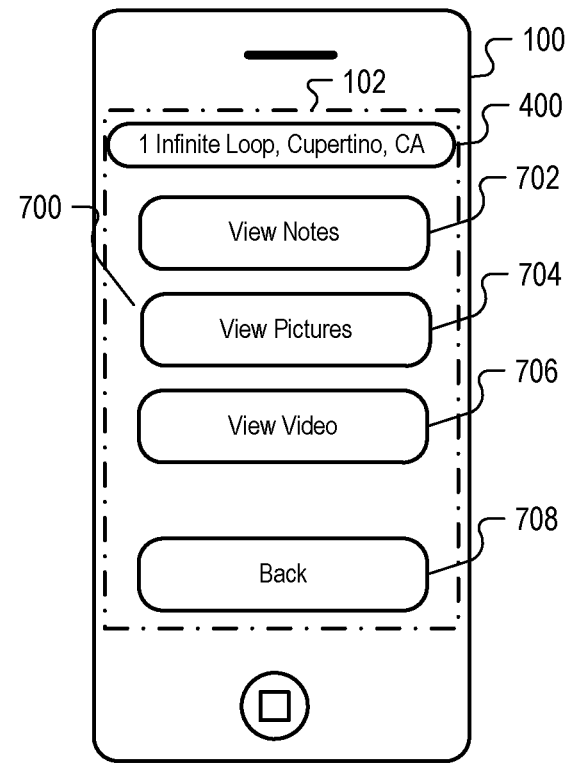

In some implementations, touching the indicator 406 presents a menu item to invoke a reviewing user interface 700 such as shown in FIG. 7. Objects such as view notes 702, view pictures 704 and view video 706 can be displayed on the user interface 700. If, for example, the view notes object 702 is selected the user interface of FIG. 6 can be displayed. If, for example, the view pictures object 704 or the view videos object 706 is selected, the user interface of FIG. 5 can be displayed. A navigation object 708 is provided, for example, to return to the previous display (e.g., map display area 402 shown in FIG. 4).

Figure 8:
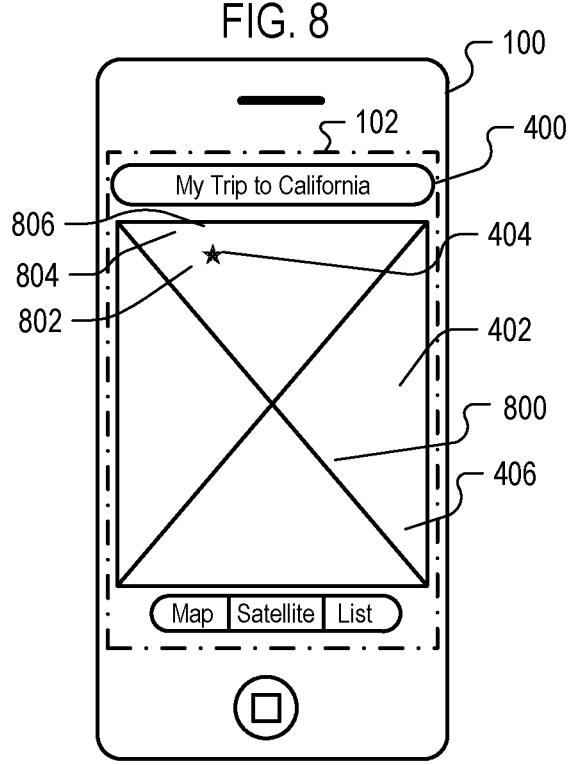

As shown in FIG. 8, in some implementations, multiple indicators 406, 800, 802, 804 and 806 can be placed on the map display area 402 to indicate multiple locations of interest. In some implementations, for each geographic location of interest, the user can capture data such as, pictures, notes, audio and video and save it to the mobile device 100 with an association to the geographic location of interest as described above with regard to indicator 406. In the example interface of FIG. 8, data associated with Palo Alto, Calif. (indicator 800) and San Francisco, Calif. (indicators 802, 804 and 806) is saved on the mobile device 100.

In some implementations the data associated with the geographic locations identified by indicators 800, 802, 804 and/or 806 can be reviewed in the reviewing user interface 700 of FIG. 7 in response to a selection of indicators 800, 802, 804 and/or 806. For example, if indicator 800 is selected, the user interface 700 is presented, however, the information display area 400 would indicate "Stanford University." Likewise, if indicator 802, 804 or 806 is selected, the information display area 400 would indicate "San Francisco," or "Downtown San Francisco," "Golden Gate Bridge," or "Alcatraz Island," respectively, if a higher level of detail is desired.

In some implementations, the data on the mobile device 100 associated with locations of interest can be uploaded to a remote storage location at one of the service providers 230, 240, 250 and 260 and/or content publishers 260, or directly to an end-user device 280.

In some implementations, the data associated with locations of interest can be played back for later viewing as a multimedia presentation. For example, in response to a selection of the maps object 144, the data saved to "My Trip to California" is retrieved and displayed in a user interface such as FIG. 9.

Figure 9:
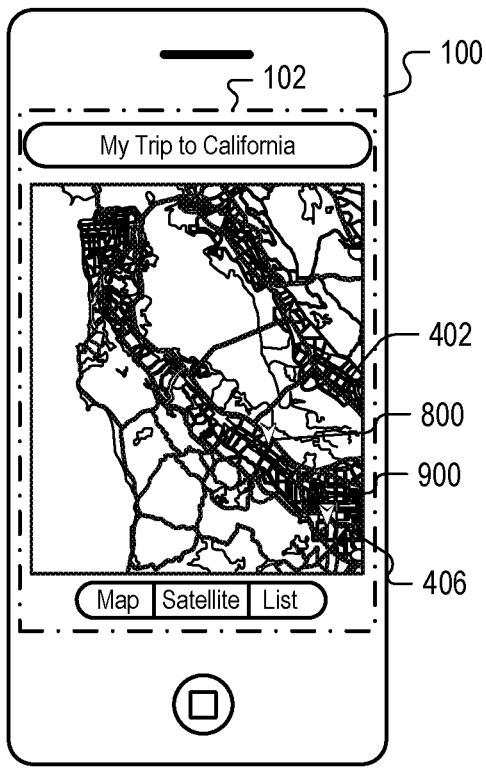

In some implementations, the multimedia presentation begins by displaying the indicator 406 on the map display area 402 as shown in FIG. 9. The presentation continues by showing selected, a predetermined portion, or all pictures, notes, audio and/or video associated with the geographic location specified by the indicator 406. For example, the user interfaces of FIGS. 4 and 5 can be displayed in response to a selection of the indicator 406 such that users can step through the pictures, notes and/or videos using the navigation objects 802 and 804.

In some implementations, as shown in FIG. 9, the multimedia presentation includes an indicator 900 illustrating a traveled route 900 associated with the saved "My Trip to California." The traveled route 900 can be indicated, for example by a line or an arrow that moves from indicator 406 to indicator 800 to illustrate a direction of travel over time. Notes, pictures, audio and/or videos associated with the location specified by indicator 800 (e.g., Stanford University) are accessible to the user as discussed above.

Figure 10:
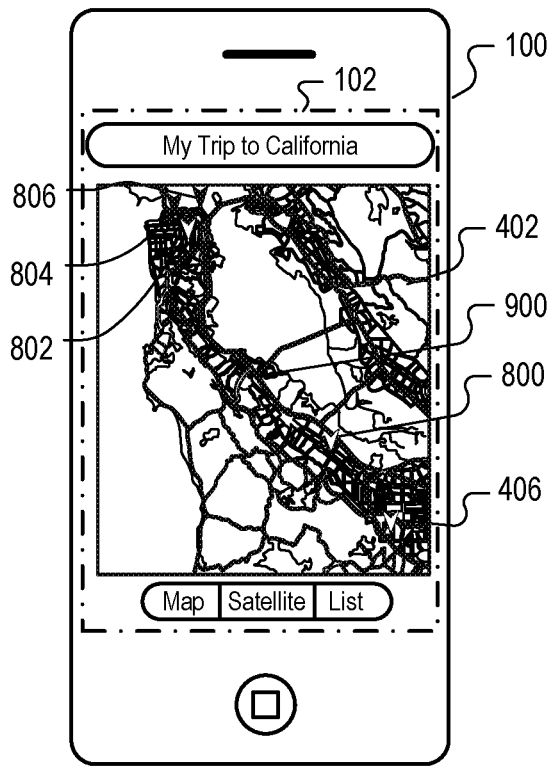

As shown in FIG. 10, the multimedia presentation illustrates the traveled route indicator 900 moving to the end in San Francisco, Calif., where indicators 802, 804 and 806 are located. Data associated with indicators 802, 804 and 806 can be displayed as indicated above with regard to indicator 406. For example, notes, pictures, audio and/or video associated with downtown San Francisco (e.g., indicator 802), the Golden Gate Bridge (e.g., indicator 804), and/or Alcatraz Island (e.g., indicator 806) can be displayed.

In some implementations, all of the data saved to "My Trip to California" is available at once rather than conveying a notion of time as described above. The user interface of FIG. 10 is used for the presentation of the pictures, notes, audio and/or video associated with the all (or a predetermined subset) of the locations of interest indicated by indicators 406, 800, 802, 804 and 806. The user interfaces of FIGS. 4 and 5 can be displayed in response to a selection of one of the indicators 406, 800, 802, 804 or 806 such that users can step through the pictures, notes and/or videos using the navigation objects 802 and 804.

In some implementations, the pictures, notes and/or videos are compiled into a movie using an authoring application that converts and aggregates the pictures, notes, audio and/or video into a multimedia video data file, such as an MPEG-2, MPEG-4 AVI, Quicklime, Windows Media, RealVideo, DivX, etc., movie file. The movie can be compiled on a mobile device 100 or remotely by one of the services 230, 240, 250 or 260, or content publishers 270. For example, in some implementations, the movie begins by displaying a map of the first geographic location of interest (e.g. Cupertino) and then displaying associated pictures, notes and videos taken by the mobile device 100 in-succession. The movie changes scenes to a second geographic location of interest (e.g. Stanford University) to display a map and associated pictures, notes, audio and videos. Finally, the movie continues until the pictures, notes, audio and videos for a final geographic location of interest (e.g., Alcatraz Island) are displayed.

In some implementations, the data associated with geographic locations can be requested by the end-user devices 280 for display. A suitable application running on an end-user device 280 makes a request over the wide area network 214 to, e.g. the media service 250, the content publisher 274, or the wireless device 100 the data to be downloaded or to download the compiled movie.

FIG. 11 is a flow diagram of an example process 1100 for indicating geographic locations of interest and acquiring data associated with the geographic locations of interest. At stage 1102, an indication is received of a geographic location of interest. For example, a location input in the information display area 400 shown in the user interface of FIGS. 4 and 5 is confirmed as a geographic location of interest by a selection of the save object 408.

At stage 1104, the geographic position information of the geographic location of interest is ascertained. For example, this information can be manually input or obtained from GPS coordinate data. At stage 1106, data associated with location is received. For example, notes, pictures, audio and/or video associated with the geographic location of interest is input to the mobile device 100 by a selection of the camera object 136 or the notes object 146.

At stage 1108, data is stored with the geographic position information. For example, the notes, pictures, audio and/or video received at stage 1106 are saved with the geographic position information in the mobile device 100. The geographic position information can be automatically appended to the notes, pictures, audio and/or video, or manually input by the user during the save operation.

At stage 1110, it is determined if more data is to be associated with the geographic location of interest. If so, the process flows to stage 1106. If no more data is to be associated with the geographic location of interest, the process returns to stage 1102.

FIG. 12 is a flow diagram of an example process 1200 for reviewing and editing data associated with geographic locations of interest. At stage 1202, an indication is received. For example, a user selects the indicator 406 and an option to edit and/or review data associated with the geographic area identified by indicator 406. At stage 1204, a user interface is provided (e.g., launched). For example, in accordance with the type of data to be displayed, one of user interfaces 500 or 600 is launched to view and/or edit pictures, videos, and/or notes associated with the geographic location of interest identified by indicator 406.

At stage 1206, an indication of an action is received. For example, a user input from one of objects 502, 504, 506 and/or 508 is received by the mobile device 100. At stage 1208, the received action is performed. For example, a next picture is displayed if the next object 502 is selected, or a previous picture is displayed if the back object 504 is selected. A displayed picture is saved if the save object 506 is selected, or deleted if the deleted object 508 is selected by the user.

FIG. 13 is a flow diagram of an example process 1300 for interactively displaying data associated with geographic locations of interest. At stage 1302, an indication is received. For example, after invoking the maps object 144, the user selects data associated with "My Trip to California." At stage 1304, data is retrieved. For example, the data associated with the saved locations of interest identified by "My Trip to California" is retrieved from the memory 350 in the mobile device 100.

At stage 1306, a user interface is displayed. For example, the user interface of FIG. 9 is displayed on the mobile device 100. At stage 1308, an indication of location is received. For example, the user selects indicator 406 on the touch sensitive display 102. At stage 1310, data is presented. For example, the interface of FIG. 7 is displayed, from which the user can select to view notes, pictures, audio and/or video. In accordance with the selection made by the user, the user interface 500 or 600 is presented to view the data requested.

After the data is presented, the flow returns to stage 1306. For example, when the user selects the back object 708, the user interface of FIG. 9 (or FIG. 10) is displayed.

FIG. 14 is a flow diagram of an example process 1400 for playback of data associated with one or more geographic locations of interest. At stage 1402, an indication is received. For example, a location input in the information display area 400 shown in the user interface of FIGS. 4 and 5 is confirmed as a geographic location of interest, or a selection of object on the touch sensitive display 102 is received.

At stage 1404, an application is launched. For example, a playback application (e.g., media player) executing on the mobile device 100 or end-user device 280 is launched. At stage 1406, data is retrieved. For example, data associated with the geographic location of interest is retrieved from the memory 350 or from a remote location and communicated over the wide area network and/or wireless network to the mobile device 100 or end-user device 280.

At stage 1408, a user interface is presented. For example, the user interface associated with the media player is displayed on the mobile device 100 or end-user device 280.

At stage 1410, the data associated with the geographic location of interest is presented in the user interface. In accordance with a playback mode, the notes, pictures, and/or video associated with the geographic locations of interest are played back in sequence without any user interaction.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications may be made to the disclosed implementations and still be within the scope of the following claims.

What is claimed is:

1. A method, comprising:
   displaying a map of a geographic region in a user interface of a first mobile device;
   receiving, at the first mobile device, user input requesting data associated with a specified geographic location in the geographic region;
   transmitting, to a remote storage location, a request for data objects captured by other mobile devices and associated with the specified geographic location;
   receiving, from the remote storage location, at least one data object associated with the specified geographic location, wherein the at least one data object is at least one of an image data object, a video data object, or a text data object,
      wherein the at least one data object was captured by and uploaded to the remote storage location by a second mobile device, and
      wherein the at least one data object is stored at the remote storage location in association with data representing the specified geographic location; and
   displaying, on the first mobile device, one or more user interface elements enabling a user to access the at least one data object.

2. The method of claim 1, wherein the one or more user interface elements include at least one of: a user interface element for accessing at least one image data object, a user interface element for accessing at least one video data object, and a user interface element for accessing at least one text data object.

3. The method of claim 1, wherein receiving the user input comprises receiving at least one of a street address and a latitude/longitude pair.

4. The method of claim 1, comprising:
   presenting, on the user interface of the mobile device, one or more user interface elements enabling a user to generate data and access locally stored data, wherein the data includes one or more of text, images, or video;
   receiving, at the mobile device, user input representing an instruction to perform an action comprising at least one of generating data and accessing locally stored data.

5. The method of claim 4, comprising:
   associating the at least one of the generated data and accessed locally stored data with the data representing the geographic location; and
   storing, on the mobile device, data representing the association of the specified geographic location and the selected data.

6. The method of claim 1, comprising displaying, in the user interface, a textual representation of the specified geographic location in association with the one or more user interface elements.

7. The method of claim 6, wherein the textual representation comprises a street address associated with the specified geographical location.

8. A non-transitory computer-readable medium including one or more sequences of instructions which, when executed by one or more processors, causes operations comprising:
   displaying a map of a geographic region in a user interface of a first mobile device;
   receiving, at the first mobile device, user input requesting data associated with a specified geographic location in the geographic region;
   transmitting, to a remote storage location, a request for data objects captured by other mobile devices and associated with the specified geographic location;
   receiving, from the remote storage location, at least one data object associated with the specified geographic location, wherein the at least one data object is at least one of an image data object, a video data object, or a text data object,
      wherein the at least one data object was captured by and uploaded to the remote storage location by a second mobile device, and
      wherein the at least one data object is stored at the remote storage location in association with data representing the specified geographic location; and
   displaying, on the first mobile device, one or more user interface elements enabling a user to access the at least one data object.

9. The non-transitory computer-readable medium of claim 8, wherein the one or more user interface elements include at least one of: a user interface element for accessing at least one image data object, a user interface element for accessing at least one video data object, and a user interface element for accessing at least one text data object.

10. The non-transitory computer-readable medium of claim 8, wherein receiving the user input comprises receiving at least one of a street address and a latitude/longitude pair.

11. The non-transitory computer-readable medium of claim 8, the operations comprising:
    presenting, on the user interface of the mobile device, one or more user interface elements enabling a user to generate data and access locally stored data, wherein the data includes one or more of text, images, or video;
    receiving, at the mobile device, user input representing an instruction to perform an action comprising at least one of generating data and accessing locally stored data.

12. The non-transitory computer-readable medium of claim 11, the operations comprising:
    associating the at least one of the generated data and accessed locally stored data with the data representing the geographic location; and
    storing, on the mobile device, data representing the association of the specified geographic location and the selected data.

13. The non-transitory computer-readable medium of claim 8, the operations comprising displaying, in the user interface, a textual representation of the specified geographic location in association with the one or more user interface elements.

14. The non-transitory computer-readable medium of claim 13, wherein the textual representation comprises a street address associated with the specified geographical location.

15. A system comprising:
one or more processors; and
a non-transitory computer-readable medium including one or more sequences of instructions which, when executed by the one or more processors, causes operations comprising:
displaying a map of a geographic region in a user interface of a first mobile device;
receiving, at the first mobile device, user input requesting data associated with a specified geographic location in the geographic region;
transmitting, to a remote storage location, a request for data objects captured by other mobile devices and associated with the specified geographic location;
receiving, from the remote storage location, at least one data object associated with the specified geographic location, wherein the at least one data object is at least one of an image data object, a video data object, or a text data object,
wherein the at least one data object was captured by and uploaded to the remote storage location by a second mobile device, and
wherein the at least one data object is stored at the remote storage location in association with data representing the specified geographic location; and
displaying, on the first mobile device, one or more user interface elements enabling a user to access the at least one data object.

16. The system of claim 15, wherein the one or more user interface elements include at least one of: a user interface element for accessing at least one image data object, a user interface element for accessing at least one video data object, and a user interface element for accessing at least one text data object.

17. The system of claim 15, wherein receiving the user input comprises receiving at least one of a street address and a latitude/longitude pair.

18. The system of claim 15, the operations comprising:
presenting, on the user interface of the mobile device, one or more user interface elements enabling a user to generate data and access locally stored data, wherein the data includes one or more of text, images, or video;
receiving, at the mobile device, user input representing an instruction to perform an action comprising at least one of generating data and accessing locally stored data.

19. The system of claim 18, the operations comprising:
associating the at least one of the generated data and accessed locally stored data with the data representing the geographic location; and
storing, on the mobile device, data representing the association of the specified geographic location and the selected data.

20. The system of claim 15, the operations comprising displaying, in the user interface, a textual representation of the specified geographic location in association with the one or more user interface elements.

21. The system of claim 20, wherein the textual representation comprises a street address associated with the specified geographical location.

* * * * *